(12) United States Patent
Tse et al.

(10) Patent No.: US 6,202,041 B1
(45) Date of Patent: Mar. 13, 2001

(54) ELECTRICAL POWER NETWORK MODELLING METHOD

(75) Inventors: Chi Tong Tse; Chi Yung Chung, both of Kowloon (HK)

(73) Assignee: Hong Kong Polytechnic University (HK)

(*) Notice: Subject to any disclaimer, the term of this patent is extended or adjusted under 35 U.S.C. 154(b) by 0 days.

(21) Appl. No.: 09/069,594

(22) Filed: Apr. 29, 1998

(51) Int. Cl.[7] .................................................. G06F 17/50
(52) U.S. Cl. ................................. 703/13; 703/22; 702/58
(58) Field of Search .......................... 395/500.23, 500.34; 702/64, 76, 58; 364/528.28; 703/22, 13

(56) References Cited

U.S. PATENT DOCUMENTS 5,594,659 * 1/1997 Schlueter .......................... 395/500.34
5,745,368 * 4/1998 Ejebe et al. .............................. 702/64

OTHER PUBLICATIONS

Parniani et al., "Computer Analysis of Small–Signal Stability of Power Systems Including Network Dynamics", IEE Proceedings Gen., Trans. and Dist., vol. 142, Issue: 6, pp. 613–617, Nov. 1995.*

Sanchez–Gasca et al. "Identifying Linear Models from Time Domain Simulations", IEEE Computer Applications in Power, vol. 10, Issue: 2, pp. 26–30, Apr. 1997.*

Yuan et al., "Eigen Analysis Method for Stability Evaluation of Linear Constant–Coeffient RDDE and its Application to Power System", Proc. IEEE Reg. 10 Conf. on Computer, Comm., Control and Power Eng., vol. 5, pp. 155–156, Oct. 1993.*

Wong et al, "Eigenvalue Analysis of Very Large Power Systems", IEEE Transactions on Power Systems, vol. 3, Issue: 2, pp. 472–480, May 1988.*

Campagnolo et al., "An Efficient and Robust Eigenvalue Method for Small–Signal Stability Assessment in Parallel Computers", IEEE Transactions on Power Systems, vol. 10, Issue:1, pp. 506–511, Feb. 1995.*

Angelidis et al., "Efficient Calculation of Critical Eigenvalue Clusters in the Small Signal Stability Analysis of Large Power Systems", IEEE Transactions on Power Systems, vol. 10, Issue:1, pp. 427–432, Feb. 1995.*

Hakavik et al., "Power System Modelling and Sparse matrix Operations Using Object–Oriented Programming", vol. 9, Issue:2, pp. 1045–1051, May 1994.*

Parniani, M.; Iravani, M.R.;"Computer Analysis of Small- -signal Stability of Power Including Network Dynamics", IEE Proceedings—Generasion, Transmission and Distribution, Vo. 142, Issue 6, pp. 613–617, Nov. 1995.*

Sanchez–Gasca, J.J.; Clark, K.; Miller, N.W.; Okamoto, H.; Kurita, A.; Chow, J.H.; "Identifying Linear Models from Time Domain Simulations", IEEE Computer Applications in Power, vol. 10, Issue 2, pp. 26–30, Apr. 1997.*

Ben–Tao Yuan; Dao–Zhi Xia; Yi–Xin Ni; "Eigen Analysis Method for Stability Evaluation of Linear Constant–coefficient RDDE and its Application to Power System", Proceedings TENCON '93, IEEE Region 10 Conference on Computer, Communications, Control and Powe, Oct. 1993.*

* cited by examiner

*Primary Examiner*—Eric W. Stamber
*Assistant Examiner*—Douglas W. Sergent
(74) *Attorney, Agent, or Firm*—Jackson Walker L.L.P.

(57) ABSTRACT

A versatile modelling for any standard power system component is disclosed, by which the component modules can be easily plugged into the network module to form a small perturbation state space model of the entire system irrespective of the complexity of the system. The state equation is available as explicitly a function of every parameter and the input and output can be any variable, thus providing insight into the physical nature by simple matrix manipulation.

2 Claims, 16 Drawing Sheets

(a)          (b)

(a) (b) (c)

(d)

ELECTRICAL POWER NETWORK MODELLING METHOD

BACKGROUND OF THE INVENTION

1. Field of the Invention

The invention relates to electrical power network modelling methods for small perturbation stability in a power transmission network.

2. Description of Prior Art

Power system stability has been and continues to be a major concern in the system or network operation. Large and small disturbance are in two main categories for stability analysis. In the past, the small disturbance performance was evaluated by the result of a transient stability program under a small perturbation. However, this simulation result will provide a limited insight because of the difficulty in taking measurements and in ensuring sufficient stability margins for swing oscillations. The small disturbance analysis is increasingly recognized because the spontaneous nature of swing oscillations can be analyzed based on a linearized system at the steady-state operating point. An eigenvalue analysis of the system described in this application can provide many insights which are difficult to be observed in transient plots.

Many methods have been proposed to represent networks, machines and associated control equipment such as the excitation system (EXC), governor system (GOV) and power system stabilizer (PSS) as well as new components of FACTs (flexible alternating current transmission) under small perturbation. In power system, the network and components are described by equations, and the control equipments are usually represented by blocks. In all other existing techniques, the control blocks are eventually transformed into equations in order to integrate with the network/component equations to form the state space equations. However, they have the following weakness:

(i) limited flexibility,
(ii) difficulty to interface with any user's new devices,
(iii) restricted input/output signal selection, e.g. $\Delta P_m$ and $\Delta V_{ref}$ for input signals,
(iv) infinite busbar assumption or restriction to a small hypothetical system,
(v) difficulty for computer program implementation,
(vi) limited exploitation of eigenvector analysis.

SUMMARY OF THE INVENTION

According to the invention there is provided an electrical system network and component modelling method for small perturbation stability in a power system, the method comprising converting the system network into elementary transfer blocks, converting the components into elementary transfer blocks, and plugging the components into the network to form a state space model of the entire system.

The invention is distinguished from the existing techniques that, instead of converting block to equations, all equations (network and component) are converted to blocks, such that blocks of control equipment (to any degree of complexity) can be easily is amalgamated by assigning simple node numbers. Because the network equations is also converted to blocks, any block modules of components, for instance machines, static var compensator (SVC), phase shifter (PS), high voltage direct current (HVDC) system and control and tieline, can be plugged into the network module.

BRIEF DESCRIPTION OF THE DRAWINGS

Embodiments of the invention will now be described by way of example with reference to the accompanying drawings in which.

DESCRIPTION OF PREFERRED EMBODIMENTS

Figure 1:
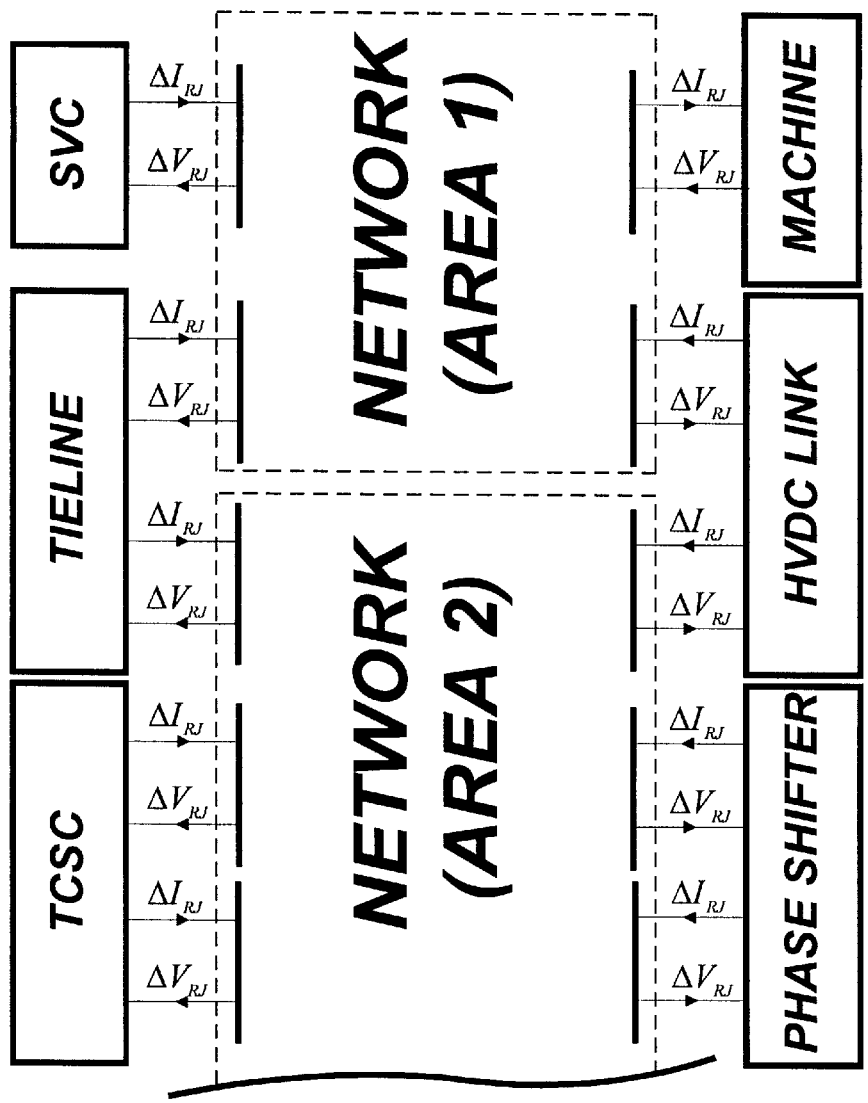
FIG. 1 is an overall view of a Plug-in Modelling Technique (PMT) connection.
Figure 2:
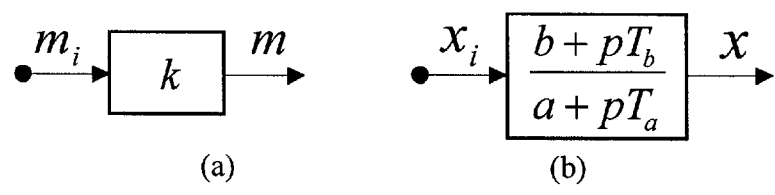
FIG. 2 shows elementary transfer blocks.

Embodiments of the invention provide pragmatic and highly versatile methods, referred to as a Plug-in Modelling is Technique (PMT). Any standard power system components such as a static var compensator (SVC) a thyristor controllable series compensator (TCSC), a phase shifter (PS), a high voltage direct current (HVDC) system and control, a tieline, as well as a generator (of any degree of complexity) associated with control equipment can be modelled as modules and plugged into a network module (FIG. 1). Because all these system components can be fully represented by two types of elementary transfer blocks and only five types of parameters as shown in FIG. 2 (where "m" and "x" are the non-state and state variables respectively), the state space equation can be obtained easily by means of matrix manipulation irrespective of the complexity of the system. Stability of the system can be examined based on time/frequency response, eigenvalues, modal, and sensitivity analysis.

In the network system modelling, the concept of the PMT is derived from a previous Generalized Multimachine Representation (GMR). In GMR, however, loads are considered as constant impedances and the system components are restricted to machines. In the present application PMT, the network formulation is much enhanced by the inclusion of load characteristics and other system components. Moreover, options of different machine modelling are also provided.

For the stability studies, the load dynamics may be considered from:

$$S = P + jQ = P_o(V/V_o)^a + jQ_o(V/V_o)^b \qquad (1)$$

Under small perturbation, the load characteristic can be represented by four fictitious admittances in (2).

$$\begin{bmatrix} \Delta I_R \\ \Delta I_J \end{bmatrix} = \begin{bmatrix} Y_{RR} & Y_{RJ} \\ Y_{JR} & Y_{JJ} \end{bmatrix} \begin{bmatrix} \Delta V_R \\ \Delta V_J \end{bmatrix} \quad (2)$$

where $$Y_{RR} = \frac{(a-2)PV_R^2}{V^4} + \frac{(b-2)QV_RV_J}{V^4} + \frac{P}{V^2}$$

$$Y_{RJ} = \frac{(a-2)PV_RV_J}{V^4} + \frac{(b-2)QV_J^2}{V^4} + \frac{Q}{V^2}$$

$$Y_{JR} = \frac{(a-2)PV_RV_J}{V^4} - \frac{(b-2)QV_R^2}{V^4} - \frac{Q}{V^2}$$

$$Y_{JJ} = \frac{(a-2)PV_J^2}{V^4} - \frac{(b-2)QV_RV_J}{V^4} + \frac{P}{V^2}$$

and subscripts RJ stand for the network frame.

Busbar injections, voltages and network admittance matrix are related by I=YV i.e.

$$\begin{bmatrix} I_G \\ -I_L \end{bmatrix} = \begin{bmatrix} Y_{GG} & Y_{GL} \\ Y_{LG} & Y_{LL} \end{bmatrix} \begin{bmatrix} V_G \\ V_L \end{bmatrix} \quad (3)$$

where subscripts G and L stand for generators and loads. Applying small perturbation and splitting the complex $Y_{N \times N}$ matrix of (3) into real $Y_{2N \times 2N}$ matrix (N=number of nodes), the load current $I_L$ is eliminated by equivalents given by (2), which is then included the block diagonal elements of Y, to obtain $$\begin{bmatrix} \Delta I_G \\ 0 \end{bmatrix} = \begin{bmatrix} Y_{GG} & Y_{GL} \\ Y_{LG} & Y_{LL} \end{bmatrix} \begin{bmatrix} \Delta V_G \\ \Delta V_L \end{bmatrix} \quad (4)$$

Thus the load buses can be eliminated to $$[\Delta I_G] = [Y'_{GG}][\Delta V_G] \quad (5)$$

where $Y'_{GG} = Y_{GG} - Y_{GL}(Y'_{LL})^{-1}Y_{LG}$ where $Y_{GG}' = Y_{GG} - Y_{GL}(Y_{LL}')^{-1}Y_{LG}$ Subsequently, only the generator buses are retained. However, if connected buses associated with other system Components are also considered, the network equation can be extended to $$\begin{bmatrix} \Delta I_G \\ -\Delta I_C \end{bmatrix} = \begin{bmatrix} Y_{GG} & Y_{GC} \\ Y_{CG} & Y_{CC} \end{bmatrix} \begin{bmatrix} \Delta V_G \\ \Delta V_C \end{bmatrix} \quad (6)$$

where $\Delta I_c$ is the component current, $\Delta V_c$ is the component busbar voltage and subscripts G and C stand for generator and other system components. Whilst generator terminals must be in series with a unique generator transformer, a component busbar can have multi-branch current flow. Therefore, the roles of the $\Delta V_c$ and $\Delta I_c$ in the network equation (6) must be swapped such that all components connected to the same busbar have a common input $\Delta V_c$. The modified network equation becomes $$\begin{bmatrix} \Delta I_{RJ_G} \\ \Delta I_{RJ_C} \end{bmatrix} = \begin{bmatrix} Y_{GG} & C_{GC} \\ C_{CG} & Z_{CC} \end{bmatrix} \begin{bmatrix} \Delta V_{RJ_G} \\ \Delta I_{RJ_C} \end{bmatrix} \quad (7)$$

where $Y_{GG}' = Y_{GC}Y_{CC}^{-1}Y_{CG}$, $C_{GC} = Y_{CC}^{-1}$, $C_{CG} = -Y_{CC}^{-1}Y_{CG}$ and $Z_{CC} = Y_{CC}^{-1}$. Note that LHS (Left Hand Side) of (7), the "output" of network, is the "input" of components.

Figure 3:
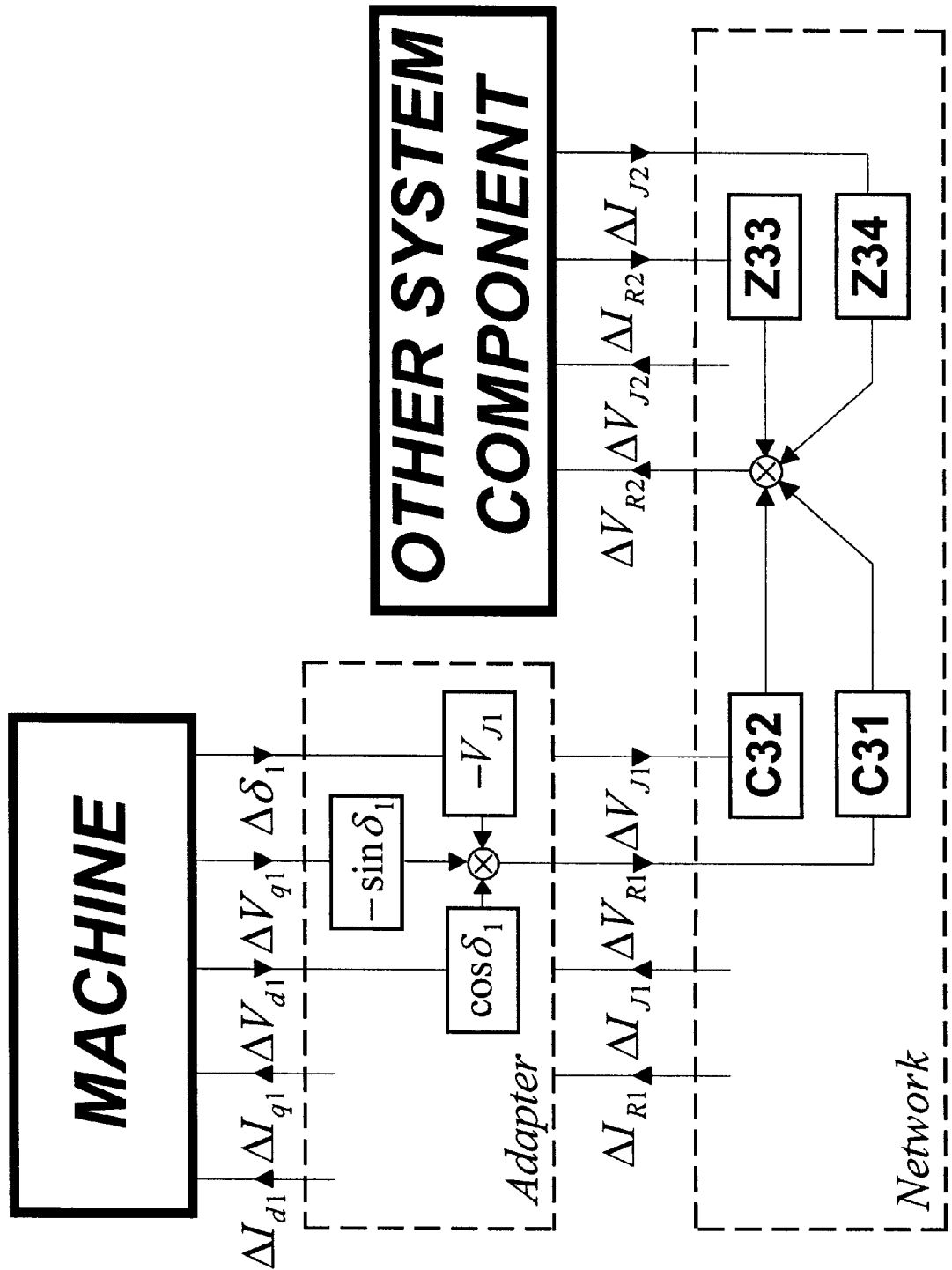
FIG. 3 is a network representation with one machine and one other component.

For instance, if the system consists one machine and one other shunt component, the full matrix equation will be $$\begin{bmatrix} \Delta I_{R1} \\ \Delta I_{J1} \\ - \\ \Delta V_{R2} \\ \Delta V_{J2} \end{bmatrix} = \begin{bmatrix} Y11 & Y12 & | & C13 & C14 \\ Y21 & Y22 & | & C23 & C24 \\ - & - & & - & - \\ C31 & C32 & | & Z33 & Z34 \\ C41 & C42 & | & Z43 & Z44 \end{bmatrix} \begin{bmatrix} \Delta V_{R1} \\ \Delta V_{J1} \\ - \\ \Delta I_{R2} \\ \Delta I_{J2} \end{bmatrix} \quad (8)$$

and these two components are connected by the network transfer blocks as shown in FIG. 3.

In creating the representations of the network components, a machine is derived from Park's two-axis machine model. Machine behaviours can be described by different sets of equations of different order in the machine frame.

For instance, the 3rd-order machine equations in Park's dq-frame are $$pE_q' = [E_{jd} - (X_d - X_d')I_d - E_q']/T_{do}' \quad (9a)$$

$$p\delta/\Omega_0 = \Omega - 1 \quad (9b)$$

$$p\Omega = [P_m - P_c]/M \quad (9c)$$

$$V_f^2 = V_d^2 + V_q^2 \quad (9d)$$

$$V_d = -R_aI_d + X_qI_q \quad (9e)$$

$$V_q = E_q' - X_d'I_d - R_aI_q \quad (9f)$$

$$P_c = V_qI_q + V_dI_d + (I_d^2 + I_q^2)R_a \quad (9g)$$

By applying small perturbation to the above equations:

$$\Delta E_q' = [\Delta E_{jd} - (X_d - X_d')\Delta I_d]/(1 + pT_{do}') \quad (10a)$$

$$\Delta \delta = \Omega_0 \Delta \Omega / p \quad (10b)$$

$$\Delta \Omega = (\Delta P_m - \Delta P_c)/pM \quad (10c)$$

$$\Delta V_t = V_d \Delta V_d / V_t + V_q \Delta V_q / V_t \quad (10d)$$

$$\Delta V_d = -R_a \Delta I_d + X_q \Delta I_q \quad (10e)$$

$$\Delta V_q = \Delta E_q' - X_d' \Delta I_d - R_a \Delta I_q \quad (10f)$$

$$\Delta P_c = (V_q + 2R_aI_q)\Delta I_q + I_q \Delta V_q + (V_d + 2R_aI_d)\Delta I_d + I_d \Delta V_d \quad (10g)$$

Figure 4:
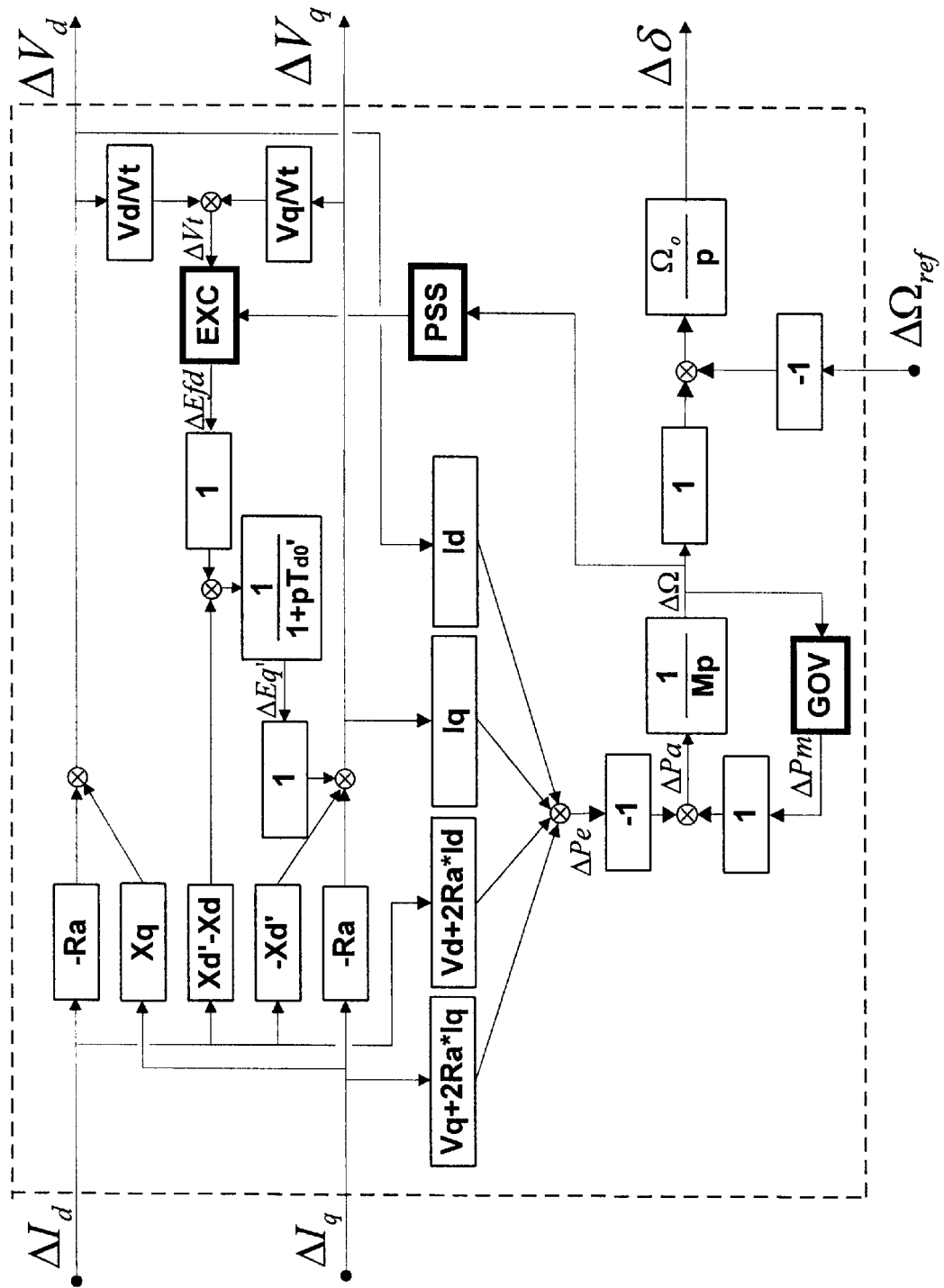
FIG. 4 is a third order machine module.
Figure 5:
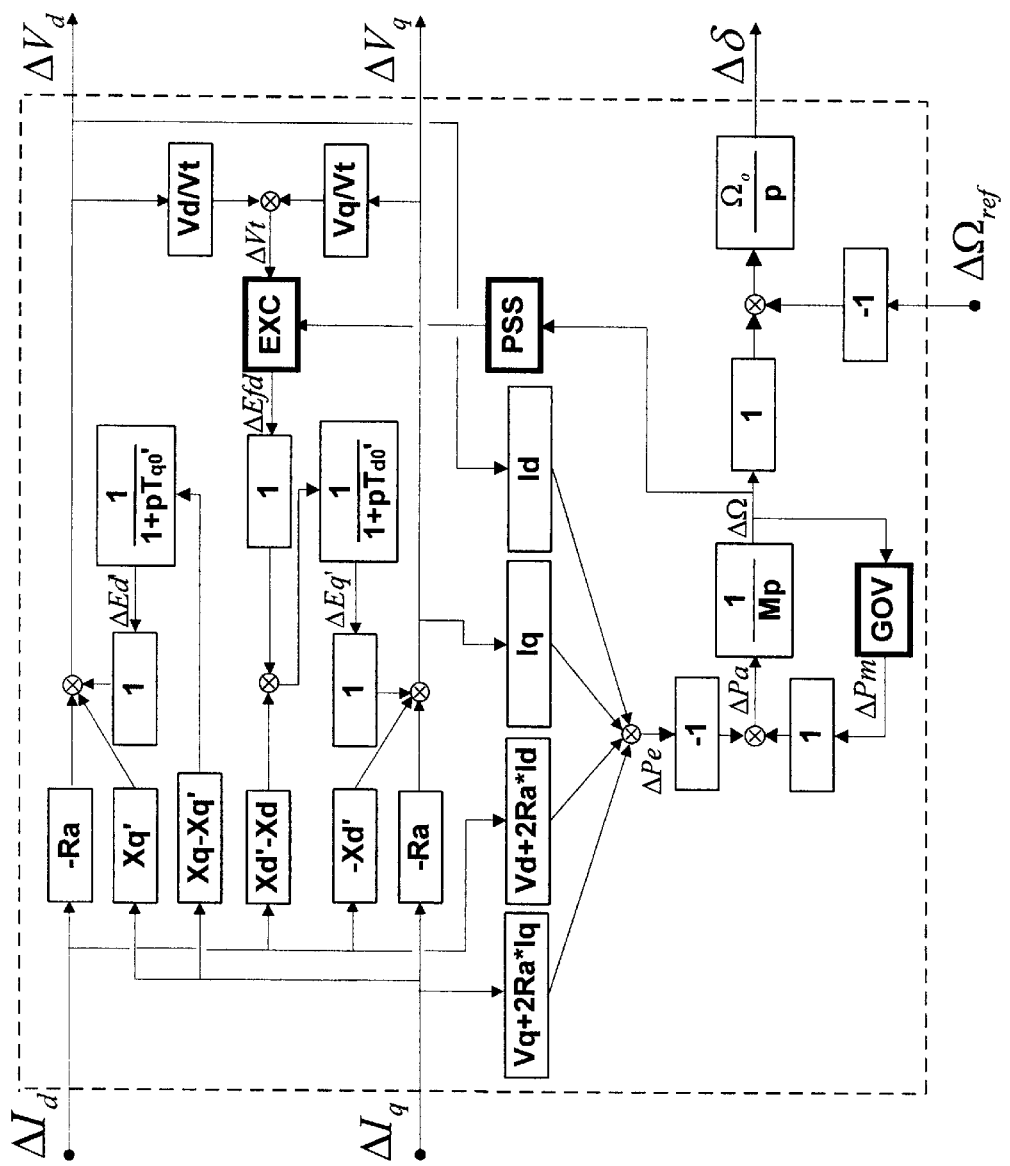
FIG. 5 is a fourth order machine module.
Figure 6:
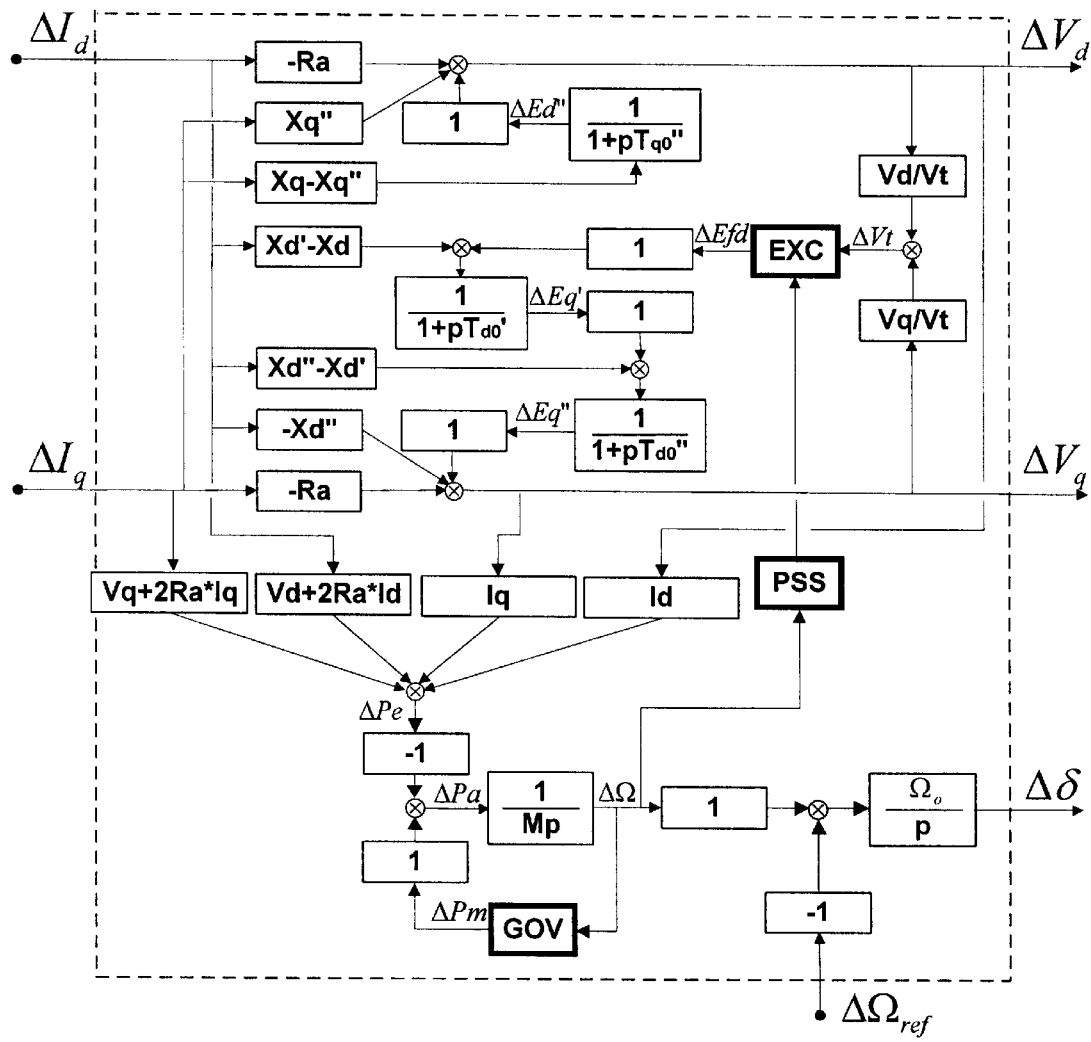
FIG. 6 is a fifth order machine module.
Figure 7:
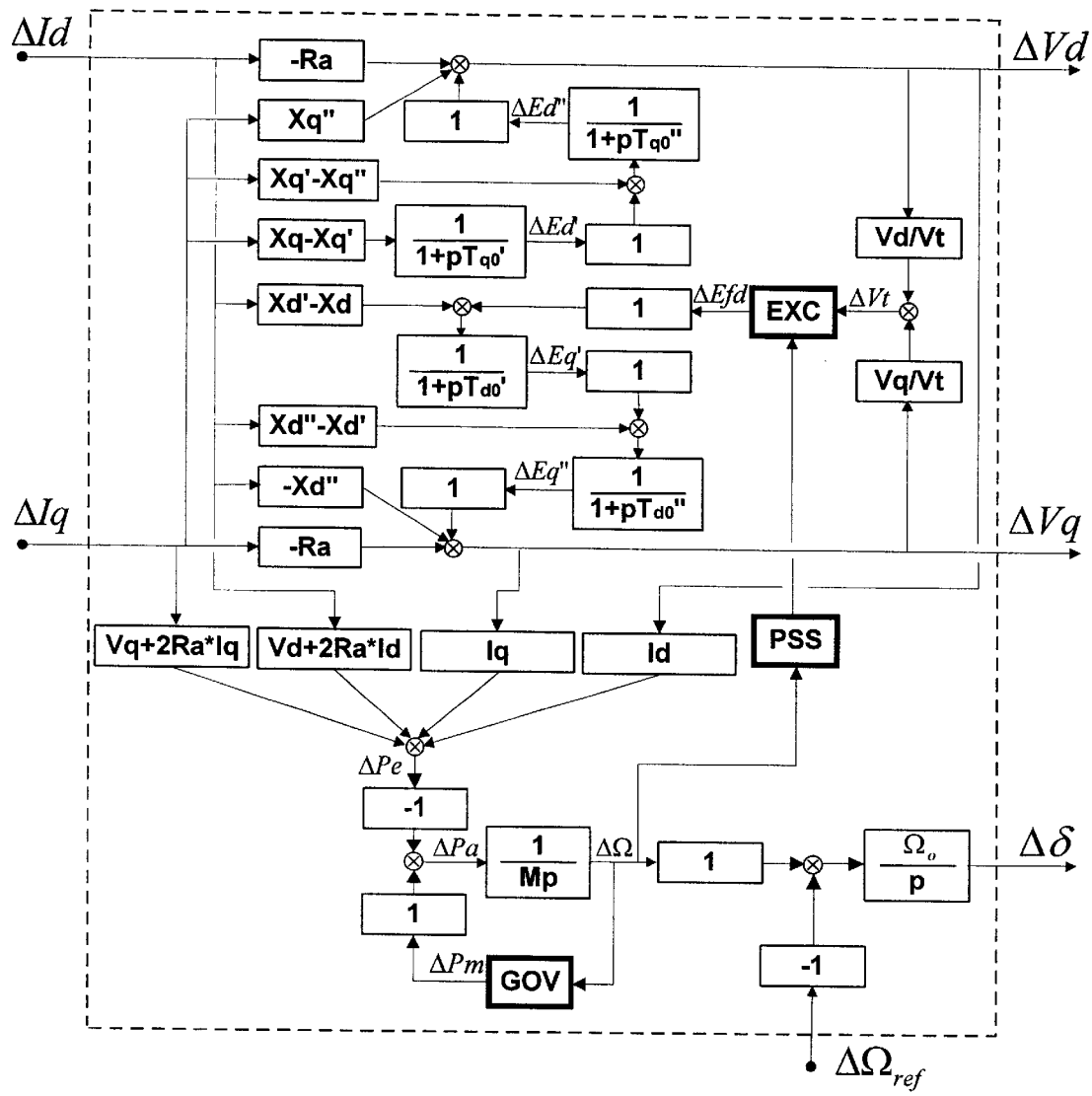
FIG. 7 is a sixth order machine module.

Equations (10) can be expressed by blocks or modules together with the block model of control equipment such EXC, GOV and PSS (FIG. 4). Thus, a self-contained individual machine module is formed as shown in FIG. 4. Other machine models can be similarly developed as shown in FIGS. 5, 6 and 7.

For a machine and network interface, the generator will have its own dq frame which can be related to the network (RJ) frame by $$I_d = I_R \cos \delta + I_J \sin \delta \quad (11a)$$

$$I_q = -I_R \sin \delta + I_J \cos \delta \quad (11b)$$

$$V_R = V_d \cos \delta - V_q \sin \delta \quad (11c)$$

$$V_J = V_d \sin \delta + V_q \cos \delta \quad (11d)$$

Under small perturbation, take the form:

$$\Delta I_d = \cos \delta \Delta I_R + \sin \delta \Delta I_J + I_q \Delta \delta \quad (12a)$$

$$\Delta I_q = -\sin \delta \Delta I_R + \cos \delta \Delta I_J - I_d \Delta \delta \quad (12b)$$

$$\Delta I'_R = \cos \delta \Delta I'_d - \sin \delta \Delta V_q - V_J \Delta \delta \quad (12c)$$

$$\Delta V_J = \sin \delta \Delta V_d + \cos \delta \Delta V_q + V_R \Delta \delta \quad (12d)$$

where δ is the angle between the dq frame and RJ frame.

Thus, the machine model can be "plugged" into the network by an adapter as shown in FIG. 3.

Formation of other component modules (such as SVC, TCSC, PS, HVDC and tieline are provided in TFDEPC. All these modules, with inputs ($\Delta V_R$, $\Delta V_J$) and outputs ($\Delta I_R$, $\Delta I_J$), can therefore be "plugged" into the network module (FIG. 1).

In network or system formation and analysis, using PMT the block structure is so general, computer algorithms (dealing only with two types of blocks and five parameters) can be easily programmed without a matrix format being concerned.

To run the program, a user has to
 (a) prepare and perform a loadflow analysis
 (b) input component data of the system (taking all the blocks, with their node numbers, within FIG. 1)
 (c) input block data of the controller for the system components such as EXC, GOV and PSS (the "standard" models may also be retrieved from separate data files if preferred)
 (d) start computation The procedure of deriving the state equations (13) and (14), see below, or evaluating the sensitivity coefficients is unaffected by the complexity of the physical system is shown in TFDEPC 9.2 and TFDEPC 9.6. Because the entire system consists of only elementary blocks, existing software such as Matlab can be used as an analytical tool and advanced control techniques provided by the toolbox of Matlab can be applied directly and easily.

$$\dot{X} = AX + BR + E\dot{R} \quad (13)$$

$$Y = CX + DR \quad (14)$$

where the $E\dot{R}$ term is often avoided in the usual representation but it does not create any analytical difficulty in the stability study.

Previously, the equipment representation (such as EXC) is limited to some specified models in order to save programming time for some "standard" packages. Due to the large variety of manufactured systems in practical use, simplification of this actual model to a specific model may provide a misleading result. It is very tedious to adjust the original EXC blocks (based on data easily obtained from the manufacturer's design) to fit them into some unrelated "standard" models. It would also be difficult to determine the optimum settings of specific control cards (e.g. the lead/lag time constants in the EXC feedback loop) since the "standard" model may contain no such blocks. Moreover, employing the "standard" model may lead to an improper PSS design, because the optimum setting is quite dependent on the EXC-PSS frequency response. The PMT of this patent application, however, facilitates the modelling of machines system components and their control equipment to any degree of complexity, including those IEEE models described by nonlinear functions or quadratic/polynomial transfer functions involving complex poles and zeros, as they can be converted readily to the elementary blocks of FIG. 2 according to TFDEPC 9.4.

Due to the improvement in solid state technology, a lot of new components are introduced such as FACTS. In order to include these kinds of components, users need to form the plant using his own program because it is very difficult (if not impossible) for a general user to integrate these new components into the existing modelling methods. Due to the modular structure of the PMT, any new system component modules can be "plugged" in the network model via the specific input/output variables described in FIG. 1. So there is no restriction to investigate system stability by consideration of the interaction among any components and the solid-state development of the power system networks applications can be enhanced.

In controller designs, the output vectors are restricted to state variables, e.g. speed or their linear combinations. This is probably because of the difficulty of deriving (14) for some non-state variable outputs e.g. $\Delta P_e$. In the so-called PQR techniques, the output variables are predefined to describe the network equation, whether they are used in subsequent system analysis or not. Due to this specified and limited input/output signals, it is difficult to take any unusual input/output signal for some typical controller design. In the PMT arrangement, any locally available variables such as voltage, current, MW, MVAr or MVA etc is can be used as control signals.

In the choice of reference frame, the infinite busbar, first introduced to reduce a system to a single machine equivalent but subsequently used to study multimachine systems, does not exist in reality. Instead of relying on an infinite busbar, an alternative assumption is that "network frequency" corresponds always to that of one arbitrarily chosen machine. However, in PMT, any machine speed can be used as a reference by means of a simple "−1" block (i.e. the connection of $\Delta \Omega_{ref}$ in FIG. 4). A more reasonable or practical reference frame is to use the center of inertia (COI) of the entire network (or within a specific area) as shown in TFDEPC 9.5. Moreover, this COI frequency can be also used as a damping signal as described above.

Although eigenvalue technique has long been recognised as an effective tool to analyse power system small perturbation stability, the potential of eigenvalue analytical tools (modal and sensitivity analyses) has so far not been fully realized in other stability studies. The main restriction has been associated with the way in which the system state equations are normally formulated. The advantages of PMT method are brought out by the relative ease of its integration with the following techniques for practical synthesis.

For modal analysis in the PMT method, mode shape for any variable associated with the eigenvalue $\lambda = \alpha + j\omega$ can be determined easily from CU, where U is the eigenvector and C is the coefficient matrix in (14). Modal analysis for non-state variables was not applied. This may be attributed to the difficulty in establishing C if the y's in Y of (14) have to contain arbitrary non-state variables, for example, $\Delta P_e$, $\Delta I_d$ or $\Delta I_q$. This is equivalent to expressing $\Delta P_e$, say, in terms of all the state variables (x's) of the machines, including EXC, PSS or governor, as well as of other components. In the PMT method, however, the y's can be chosen as any system variables or their combination without any restriction For sensitivity for arbitrary block parameters in the PMT method, matrix A is a function of all transfer block parameters so that the final expressions of $\partial \lambda / \partial \kappa$ are only simple algebraic scalar operations (e.g. $\partial \lambda / \partial b = wz/(hT_a)$) where the scalars (e.g. w,z and h) can be derived very easily from U and V as shown in TFDEPC 6.6.1. ("$T_a$" and "b" are known transfer block parameters.)

The sensitivity expression for a change in block parameter is simple and straight forward. However, if the change is on a system parameter, numerous block parameters will be affected. For instance, the change in a bus MW loading $P_{Li}$ will affect all nodal voltages and the operating conditions of generators, which results in the change of some machine block parameters. Change in a line reactance $X_{ij}$ will furthermore affect the block parameters associated with the elements of matrices $Y_{GC}'$, $C_{GC}$, $C_{CG}$ and $Z_{CC}$ in the network equation (7). Fortunately, these changes, although very numerous, only affect the m-block parameters. With properly reordering the m-blocks as:

$$M = [M_1, M_2/M_3] \quad (16)$$

where
   $M_1$=parameters varying with nodal voltages,
   $M_2$=parameters being the elements of matrices $Y_{GG}'$, $C_{GC}$, $C_{CG}$ and $Z_{CC}$,
   $M_3$=the rest constant parameters it is still possible to obtain $\partial A/\partial \kappa$ from the partial derivatives of the m-block parameters. Matrices $Y_{GC}'$, $C_{GC}$, $C_{CG}$ and $Z_{CC}$ associated with $M_2$ are created from the blocked matrix manipulation of nodal admittance matrix $Y_{GG}$, $Y_{GC}$, $Y_{CG}$ and $Y_{CC}$ in (6). While the block parameters belonging to $M_1$, such as $V_d$, $V_q$, $I_d$, $I_q$, $V_t$, $\cos\delta$ and $\sin\delta$ etc., can be expressed by busbar voltages (V and $\delta$), even though these buses may have been eliminated in (7). Finally it is possible to evaluate $\partial \lambda / \partial \kappa$, for $\kappa = P_j$, $Q_j$ (arbitrary bus injection), $G_{ij}$ or $B_{ij}$ (arbitrary circuit admittance), because the differentiation of V or $\delta$ with respect to nodal injections has been determined in the loadflow algorithm.

The complicated sensitivity expression for system parameters are summarized in TFDEPC 9.6.2 for constant admittance load and third order machine model only. These equations can be directly applied to a higher-order machine model, or easily extended to other system components and load representations. What is needed is only the reordering of m-blocks and the reconstruction of $M_1$, $M_2$ and $M_3$. The sensitivity technique $\partial \lambda / \partial \kappa$ for $\kappa = V_R$, $V_J$ has been applied to the probabilistic analysis of load variation, the sensitivity $\partial \lambda / \partial \kappa$ for $\kappa = Q_L$ has been applied to identify the best SVC location. The second order sensitivities $\partial^2 \lambda / (\partial \kappa_i \partial \kappa_j)$ for $\kappa_i = V_R$, $V_J$ and $K_j$=(PSS gain) can be used for evaluating the probabilistic distribution of sensitivity coefficient.

The validation of the PMT algorithms can be divided into two stages. The first stage (in three steps) is to compare the results with the well-known Heffron Phillips (HP) model.
   (a) Machine modelling is first checked by using the new single machine infinite bus model as established in TFDEPC 9.8.
   (b) The multimachine network described by (5) is checked against HP using a 2-machine 2-node system in which one machine (reference) has very large inertia and the output voltages $\Delta V_d$ and $\Delta V_q$ are made zero.
   (c) This network equation (5) is once more checked by a large N-machine system in which two identical machines are connected to an arbitrary bus via identical reactance $X_e$. (e.g. generator transformer reactance)

The above will confirm the validity of the 3rd-order machine model together with the network equation (5) because all the eigenvalues obtained in HP analysis reappear in all the above cases irrespective the complexity of EXC/GOV representations, although some more eigenvalues are present in (b) and (c) because there is more than one machine. The next stage is to check the network equation (7) (with any component) with the validated network equation (5) (with machines only):
   (d) by treating an arbitrary transmission line (eventually eliminated in (5)) as a line component in (7),
   (e) by treating a capacitor as a SVC component without feedback control,
   (f) with the existence of both multi-SVC and multi-line components.

Figure 8:
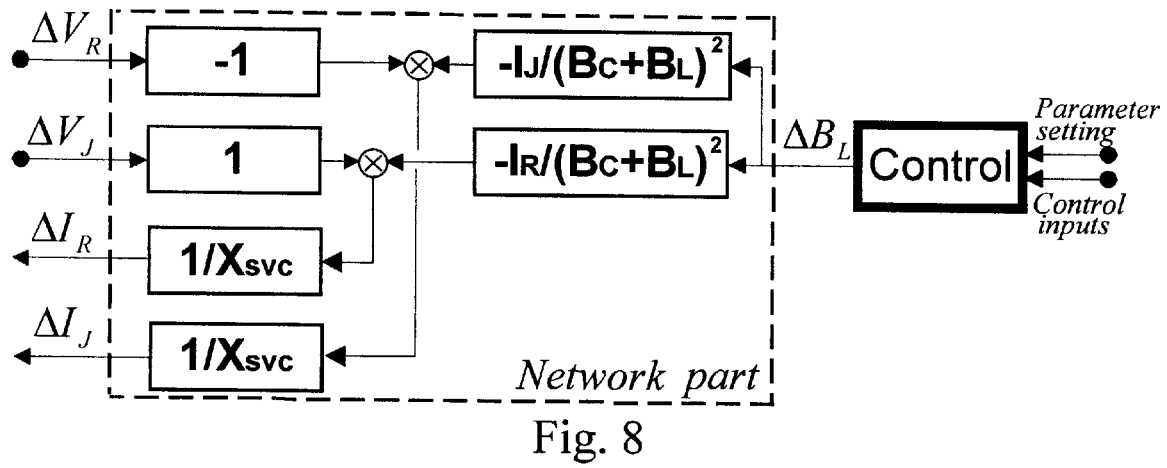
FIG. 8 is an SVC module.

The validity of the network equation (7) can also be confirmed because eigenvalues obtained in computer runs are identical to the original (i.e. without SVC/line component). Note that the shunt SVC component connected to one node (FIG. 8) and the series line component connected between two nodes (FIG. 9) reflect the different ways of modular system connection.

Transfer Function Descriptions of Electric Power Components (Referred in the Specification as "TFDEPC")

9.1.2.1 Static Var Compensator (SVC)

Figure 14:
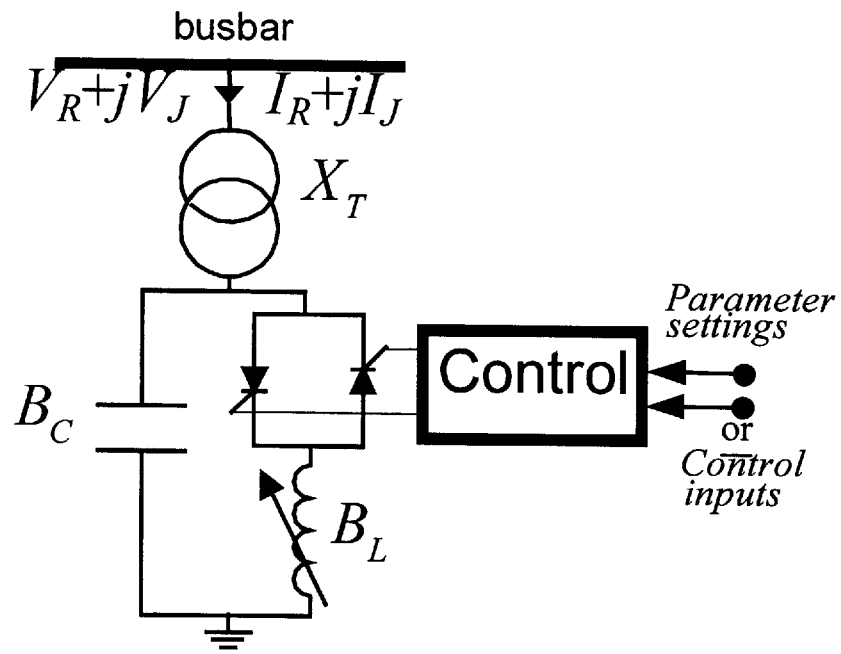
FIG. 14 is a configuration of an SVC.

A typical SVC configuration with thyristor controlled reactor & fixed capacitor connected to a busbar through a step-down transformer is shown in FIG. 14 where $X_r$ is the transformer impedance, $B_C$ and $B_L$ are the susceptance of capacitor and inductor. The SVC equations can be written as $$X_{SVC} = X_T - \frac{1}{B_C + B_L} \quad (108)$$

$$\begin{bmatrix} V_R \\ V_J \end{bmatrix} = X_{SVC} \begin{bmatrix} -I_J \\ I_R \end{bmatrix} \quad (109)$$

Figure 15:
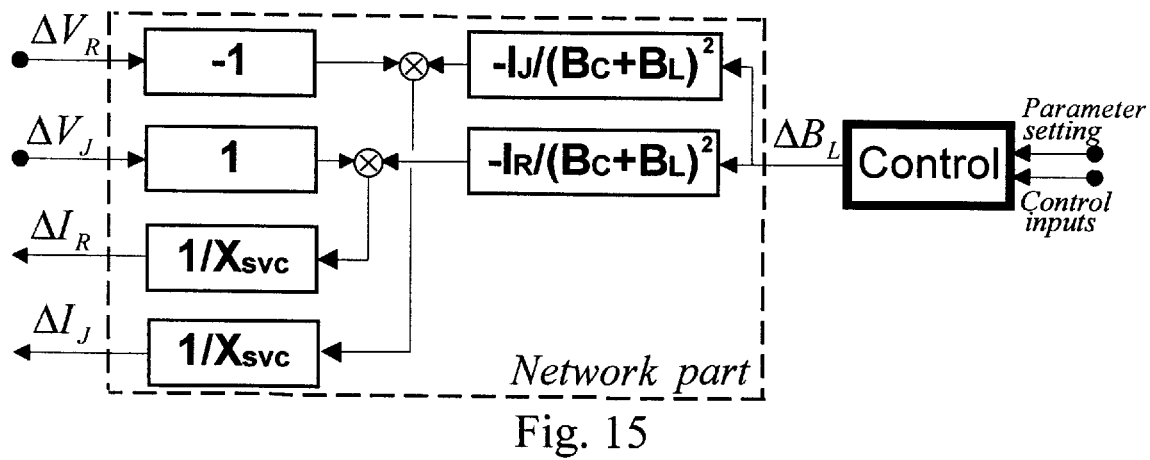
FIG. 15 is an SVC module.
Figure 16:
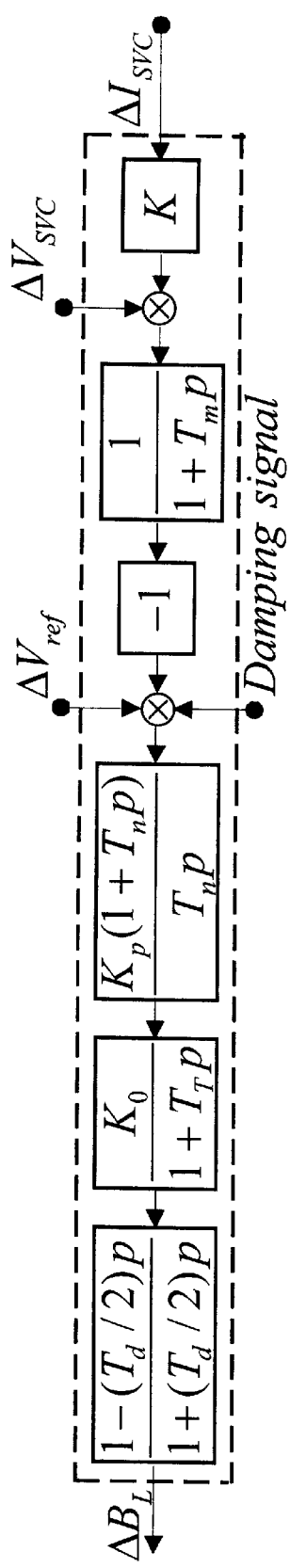
FIG. 16 is a general SVC voltage control.

Substituting eqn.108 in eqn.109 and applying small perturbation, eqn. 110 can be obtained and the block diagram of SVC is created in FIG. 15. Besides, the general SVC thyristor controller block diagram is included in FIG. 16 where $V_{SVC}$ and $I_{SVC}$ are the magnitude of voltage and current at the SVC terminal [16].

$$\begin{bmatrix} \Delta I_R \\ \Delta I_J \end{bmatrix} = \frac{1}{X_{SVC}} \left\{ \begin{bmatrix} \Delta V_J \\ -\Delta V_R \end{bmatrix} - \frac{1}{(B_C + B_L)^2} \begin{bmatrix} I_R \\ I_J \end{bmatrix} \Delta B_L \right\} \quad (110)$$

9.1.2.3 Thyristor Controlled Series Compensator (TCSC)

Figure 17:
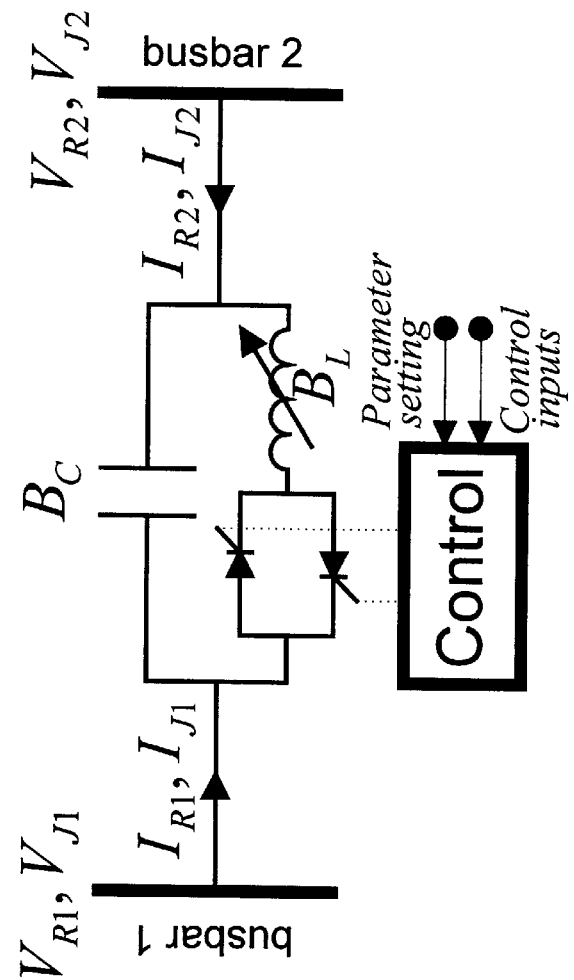
FIG. 17 is configuration of a TCSC.

A typical TCSC configuration with thyristor controlled reactor & fixed capacitor connected in series with the transmission line is shown in FIG. 17 and described by $$X_{TCSC} = -\frac{1}{B_C + B_L} \quad (111)$$

$$\begin{bmatrix} V_{R1} - V_{R2} \\ V_{J1} - V_{J2} \end{bmatrix} = X_{TCSC} \begin{bmatrix} -I_{J1} \\ I_{R1} \end{bmatrix} \quad (112)$$

$$\begin{bmatrix} I_{R1} \\ I_{J1} \end{bmatrix} = -\begin{bmatrix} I_{R2} \\ I_{J2} \end{bmatrix} \quad (113)$$

Figure 18:
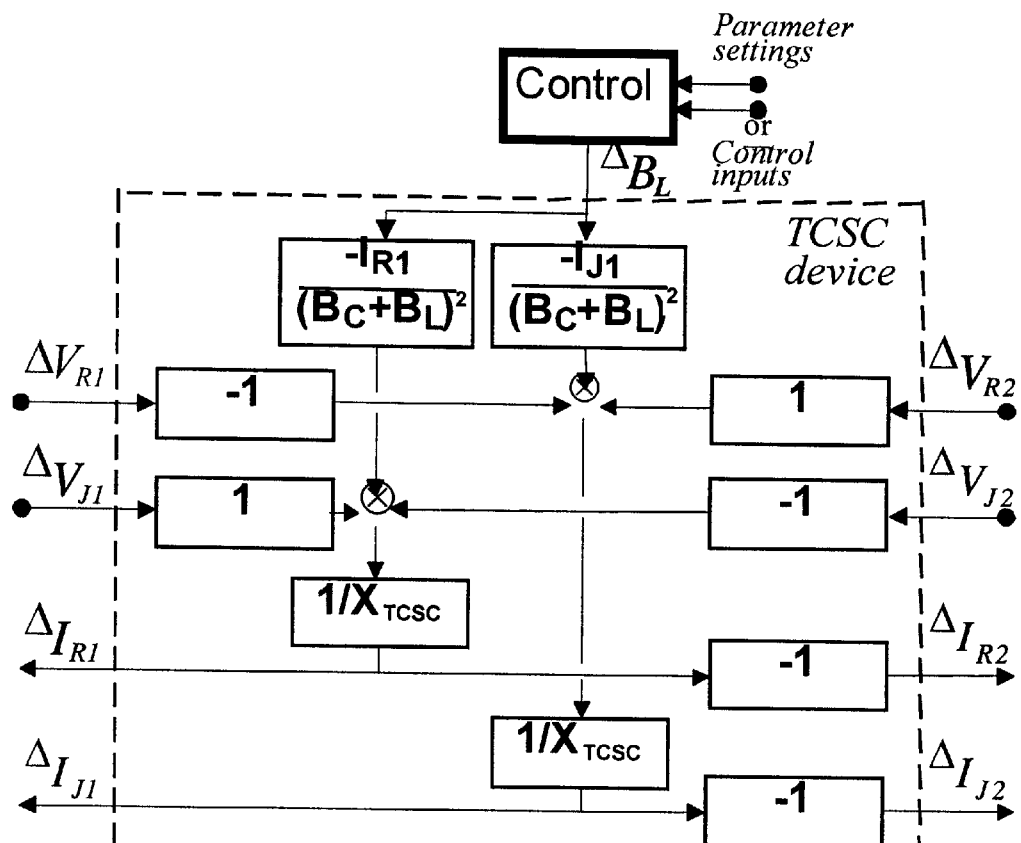
FIG. 18 is a TCSC module.

By applying small perturbation to the above equations and rearranging, eqn.114 can be obtained and the block diagram for the TCSC can be represented by FIG. 18.

$$\begin{bmatrix} \Delta I_{R1} \\ \Delta I_{J1} \end{bmatrix} = \frac{1}{X_{TCSC}} \left\{ \begin{bmatrix} \Delta V_{J1} - \Delta V_{J2} \\ -\Delta V_{R1} + \Delta V_{R2} \end{bmatrix} - \frac{1}{(B_C + B_L)^2} \begin{bmatrix} I_{R1} \\ I_{J1} \end{bmatrix} \Delta B_L \right\} \quad (114)$$

9.1.2.4 Phase Shifter (PS)

Consider a phase shifter connected between busbars 1 & 2 and represented by voltage ratio $T=1\angle\psi$ in series with transformer admittance (y) as shown in FIG. 18, eqn.115 would be obtained.

$$\begin{bmatrix} I_1 \\ I_2 \end{bmatrix} = y \begin{bmatrix} 1 & -T \\ -T^* & 1 \end{bmatrix} \begin{bmatrix} V_1 \\ V_2 \end{bmatrix} \quad (115)$$

By applying small perturbation to eqn.115, then $$\begin{bmatrix} \Delta I_1 \\ \Delta I_2 \end{bmatrix} = y \begin{bmatrix} 1 & -T \\ -T^* & 1 \end{bmatrix} \begin{bmatrix} \Delta V_1 \\ \Delta V_2 \end{bmatrix} + y \begin{bmatrix} -jV_2T \\ jV_1T^* \end{bmatrix} \Delta \psi \quad (116)$$

Figure 19:
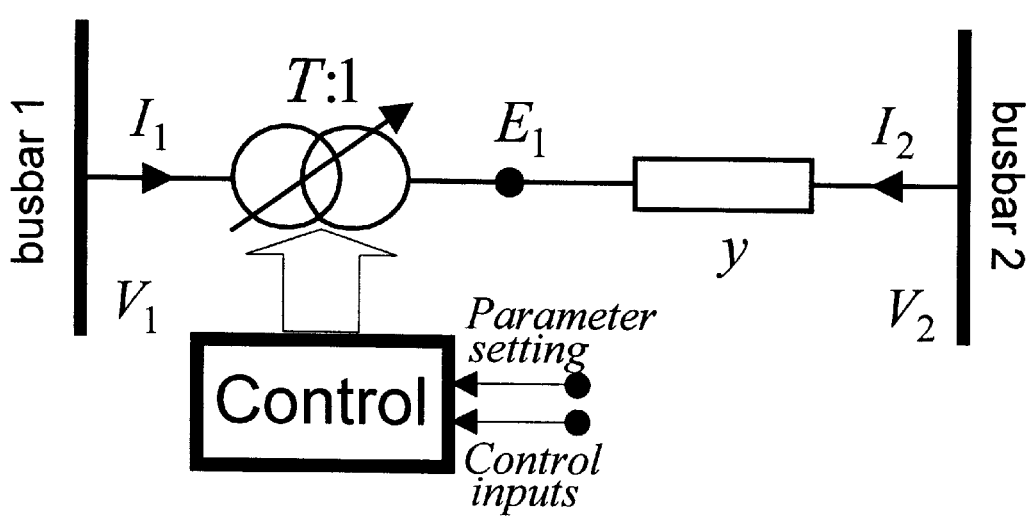
FIG. 19 is a configuration of a phase shifter.

Splitting the complex matrix to real variable matrix, eqn.117 and FIG. 19 can be obtained.

$$\begin{bmatrix} \Delta I_{R1} \\ \Delta I_{J1} \\ \Delta I_{R2} \\ \Delta I_{J2} \end{bmatrix} = \begin{bmatrix} G_{11} & -B_{11} & G_{12} & -B_{11} \\ B_{11} & G_{11} & B_{12} & G_{12} \\ G_{21} & -B_{21} & G_{22} & -B_{22} \\ B_{21} & G_{21} & B_{22} & G_{22} \end{bmatrix} \begin{bmatrix} \Delta V_{R1} \\ \Delta V_{J1} \\ \Delta V_{R2} \\ \Delta V_{J2} \end{bmatrix} + \begin{bmatrix} K_{R1} \\ K_{J1} \\ K_{R2} \\ K_{J2} \end{bmatrix} \Delta \psi \quad (117)$$

i.e.

$$[\Delta I_{RJ}] = [Y_{PS}][\Delta V_{RJ}] + [K_{PS}]\Delta \psi \quad (118)$$

9.1.2.5 High Voltage Direct Current System

Figure 20:
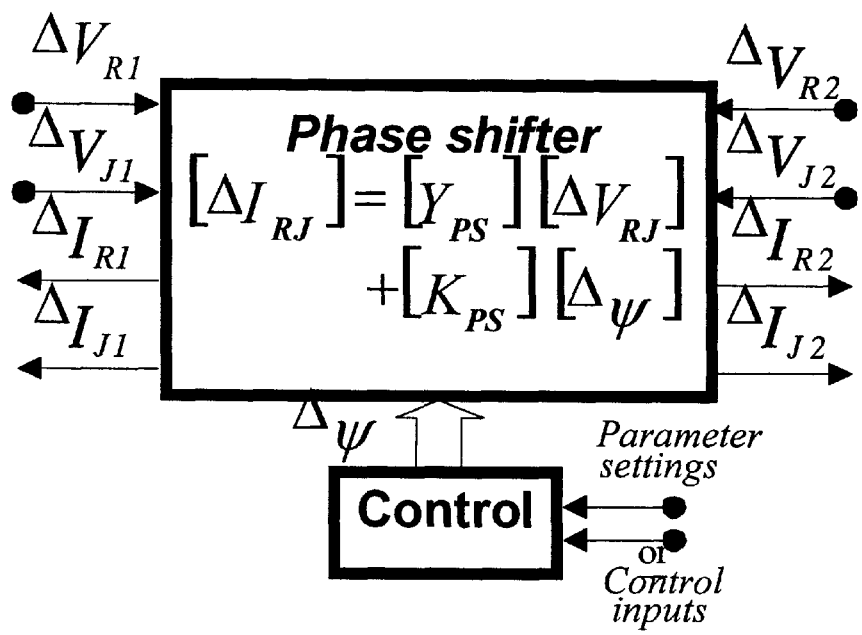
FIG. 20 is a PS module.
Figure 21:
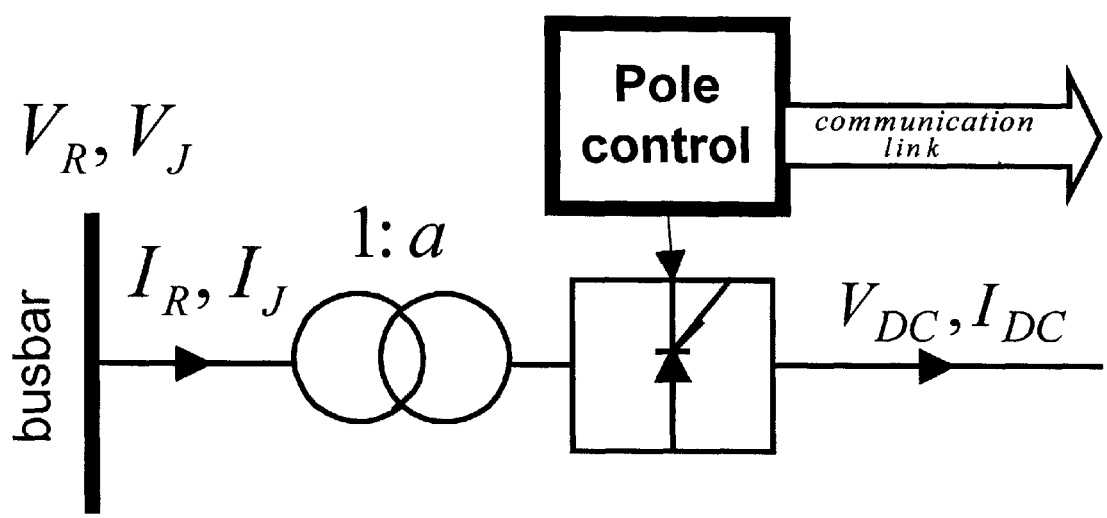
FIG. 21 is a configuration of an AC/DC network at one terminal.

Configuration of AC/DC network at each terminal is shown in FIG. 20.

Converter Equation (117)

$$V_{DC} = V_{do} \cos \alpha - R_C I_{DC} \quad (119)$$

$$V_R I_R + V_J I_J = V_{DC} I_{Dc} \quad (120)$$

$$I_R^2 + I_J^2 = k_{DC} I_{DC}^2 \quad (121)$$

where $$k_{DC} = \frac{18}{\pi^2} a^2 k^2 n^2 B^2$$

$V_{do} = 3\sqrt{(2)} \alpha V_r B / \pi$ and is the communication overlap factor,
n is the number of poles per terminal,
B is the number of bridges in series for each pole.
a is the off-nominal turns ration of the transformer
Applying small perturbation, $$\Delta V_{DC} = \frac{3\sqrt{2}}{\pi} a B \cos \alpha \Delta V_t + V_{do} \Delta \cos \alpha - R_C \Delta I_{DC} \quad (122)$$

$$\begin{bmatrix} \Delta I_R \\ \Delta I_J \end{bmatrix} = R \begin{bmatrix} \Delta I_{DC} \\ \Delta V_{DC} \end{bmatrix} + N \begin{bmatrix} \Delta V_R \\ \Delta V_J \end{bmatrix} \quad (123)$$

where $$R = \frac{1}{M} \begin{bmatrix} k_{DC} I_{DC} V_J - nI_J I_{DC} & -nI_J I_{DC} \\ -k_{DC} I_{DC} V_R + nI_R V_{DC} & nI_R I_{DC} \end{bmatrix} = \begin{bmatrix} R_{11} & R_{12} \\ R_{21} & R_{22} \end{bmatrix}$$

$$N = \frac{1}{M} \begin{bmatrix} I_R I_J & I_J^2 \\ -I_R^2 & -I_R I_J \end{bmatrix} = \begin{bmatrix} N_{11} & N_{12} \\ N_{21} & N_{22} \end{bmatrix}$$

and $M = I_R V_J - I_J V_R$

Current Regulator Equation $$p \cos \alpha = \frac{K_C}{T_C}(I_{DC} - I_{ref} - U_C) - \frac{1}{T_C} \cos \alpha \quad (124)$$

Under small perturbation, $$\Delta \cos \alpha = \frac{K_C}{1 + pT_C}(\Delta I_{DC} - \Delta I_{ref} - \Delta U_C) \quad (125)$$

i.e. The firing angle ($\alpha$) in eqns.119,122,124 and 125 will become the advance angle ($\beta$) and $I_{DC}$ will become negative for inverter side.

DCA Network

If a T-model is used to represent the DC line (FIG. 22), then $$V_{DC1} = R_1 I_{DC1} + L_1 p I_{DC1} + V_C \quad (126)$$

$$V_{DC2} = R_2 I_{DC2} + L_2 p I_{DC2} + V_C \quad (127)$$

$$V_C = \frac{1}{Cp}(I_{DC1} + I_{DC2}) \quad (128)$$

Hence $$\Delta I_{DC1} = \frac{\Delta V_{DC1} - \Delta V_C}{R_1 + L_1 p} \quad (129)$$

$$\Delta I_{DC2} = \frac{\Delta V_{DC2} - \Delta V_C}{R_2 + L_2 p} \quad (130)$$

$$\Delta V_C = \frac{1}{Cp}(\Delta I_{DC1} + \Delta I_{DC2}) \quad (131)$$

Figure 22:
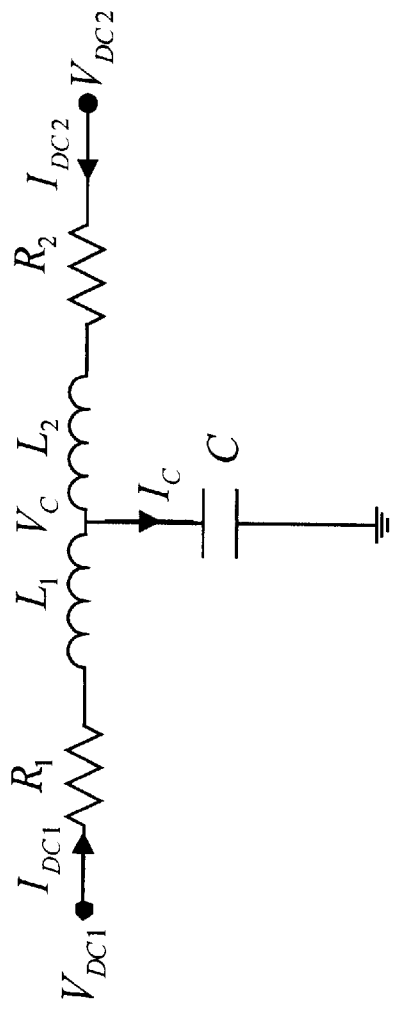
FIG. 22 is an equivalent T-circuit of a HVDC link.
Figure 23:
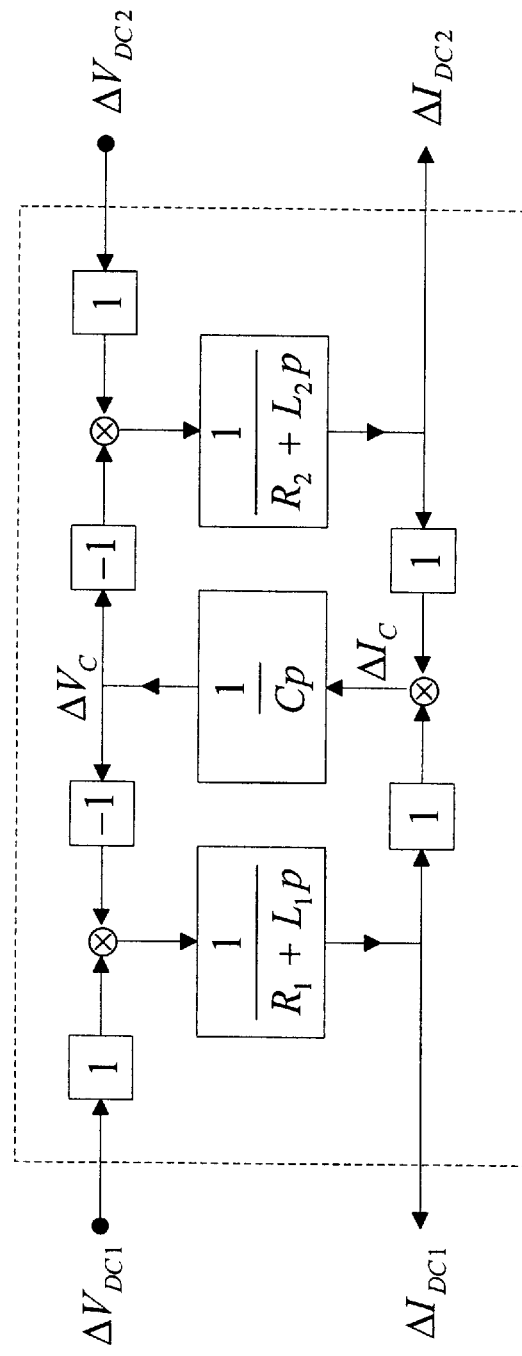
FIG. 23 is a DC transmission line module.
Figure 24:
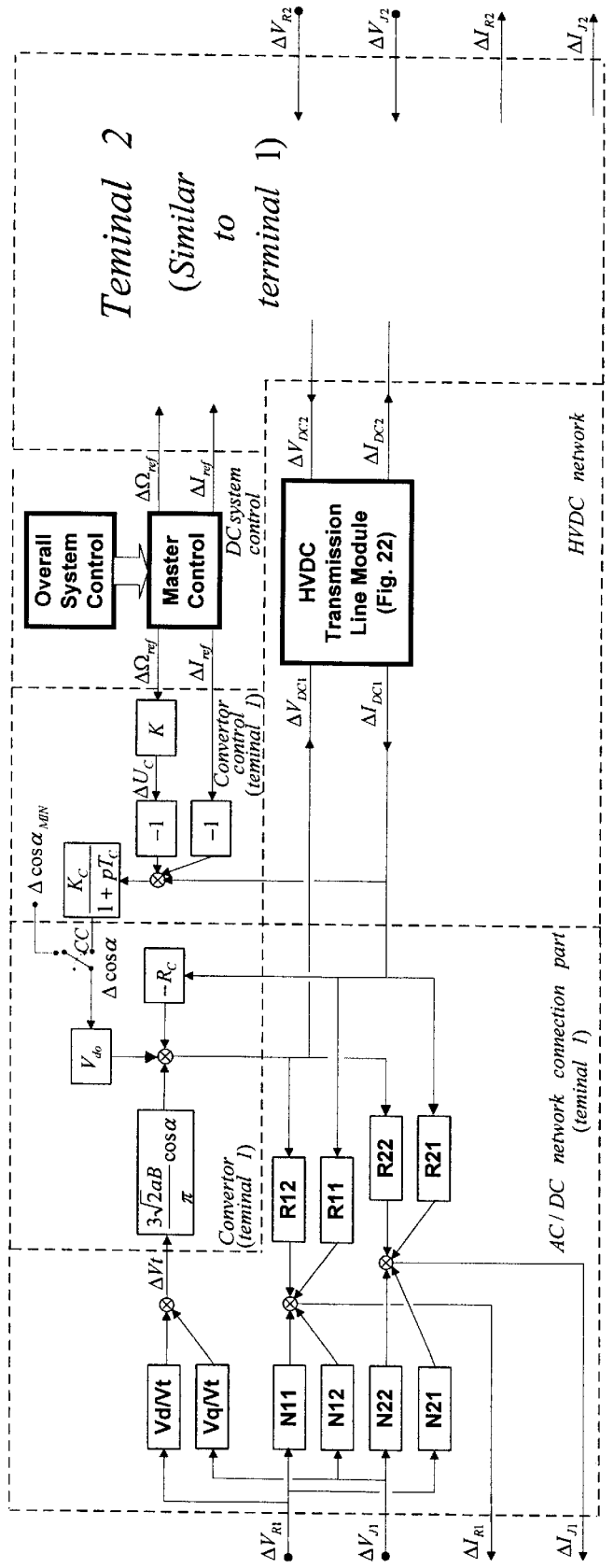
FIG. 24 is an HVDC link module.
Figure 25:
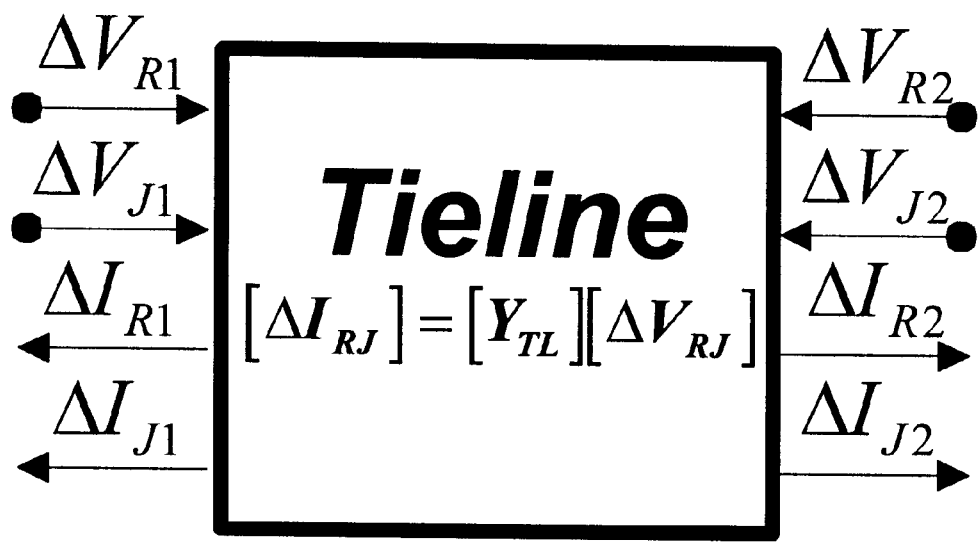
FIG. 25 is a tie line module.

Therefore, the block diagram of a DC transmission line is formed as FIG. 22 and the HVDC link module can be obtained as shown in FIG. 23.

9.1.2.6 Tieline

Tieline flow is one of the very effective damping signal. In order to get/monitor this signal, the tieline (or any circuit) has to be treated as one of the system components. Since the terminal voltages & currents of a tieline can be related by:

$$\begin{bmatrix} I_1 \\ I_2 \end{bmatrix} = \begin{bmatrix} Y_{11} & Y_{12} \\ Y_{21} & Y_{22} \end{bmatrix} \begin{bmatrix} V_1 \\ V_2 \end{bmatrix} \quad (132)$$

$$\begin{bmatrix} \Delta I_1 \\ \Delta I_2 \end{bmatrix} = \begin{bmatrix} Y_{11} & Y_{12} \\ Y_{21} & Y_{22} \end{bmatrix} \begin{bmatrix} \Delta V_1 \\ \Delta V_2 \end{bmatrix} \quad (133)$$

Figure 9:
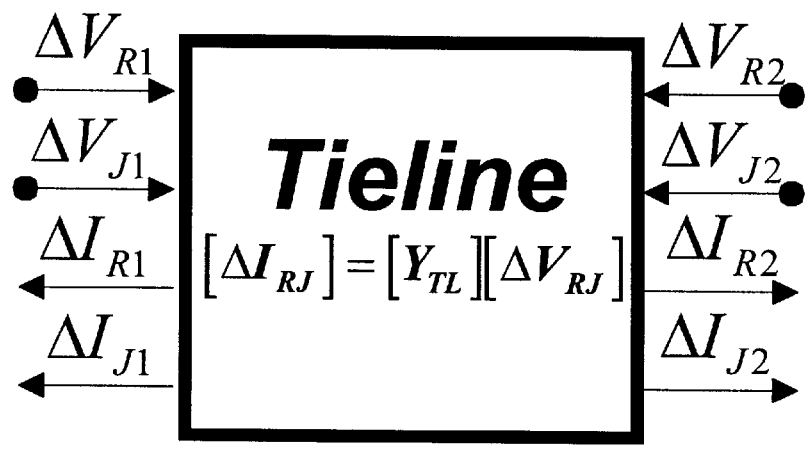
FIG. 9 is a tieline module.
Figure 10:
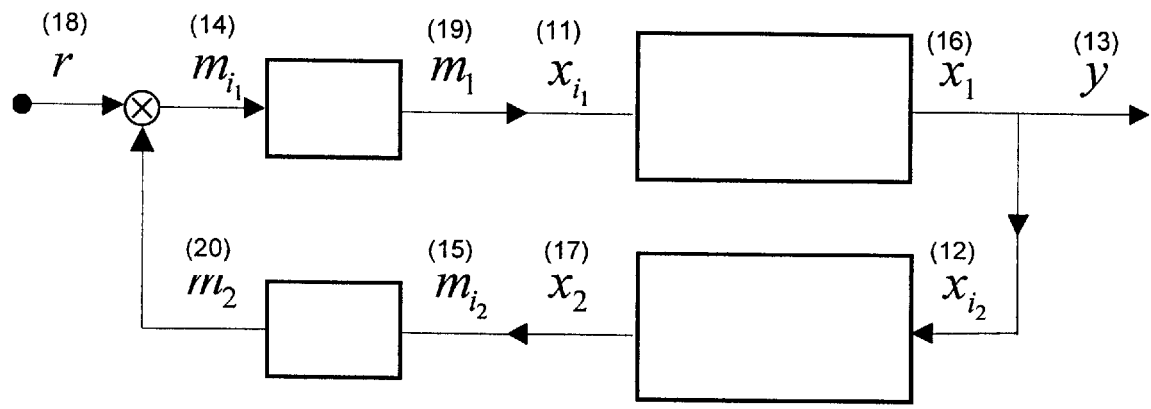
FIG. 10 is an example of a 4-block system.
Figure 11:
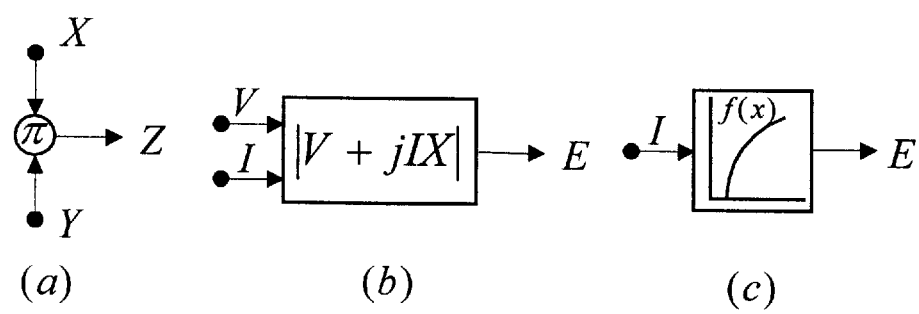
FIG. 11 is an example of "non-elementary" transfer functions.
Figure 11:
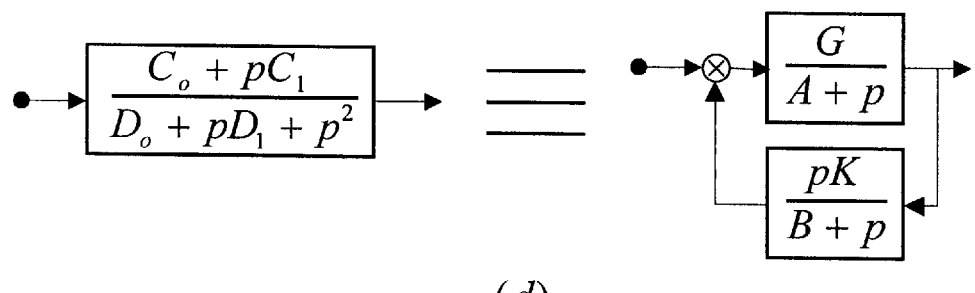

By splitting the complex matrix to real variable matrix, $$[\Delta I_{RJ}] = [Y_{TL}][\Delta V_{RJ}] \quad (134)$$

and the tieline model is shown in FIG. 9. Thus any tieline signals at either side can be obtained by $$\Delta P = V_R \Delta I_R + I_R \Delta V_R + V_J \Delta I_J + I_J \Delta V_J \quad (135)$$

$$\Delta Q = V_J \Delta I_R - I_J \Delta V_R - V_R \Delta I_J + I_R \Delta V_J \quad (136)$$

$$\Delta S = \frac{P}{S} \Delta P + \frac{Q}{S} \Delta Q \quad (137)$$

-continued $$\Delta I = \frac{I_R}{I}\Delta I_R + \frac{I_J}{I}\Delta I_J \quad (138)$$

$$\Delta V = \frac{V_R}{V}\Delta V_R + \frac{V_J}{V}\Delta V_J \quad (139)$$

9.2 Formation of State Space Equation

Figure 12:
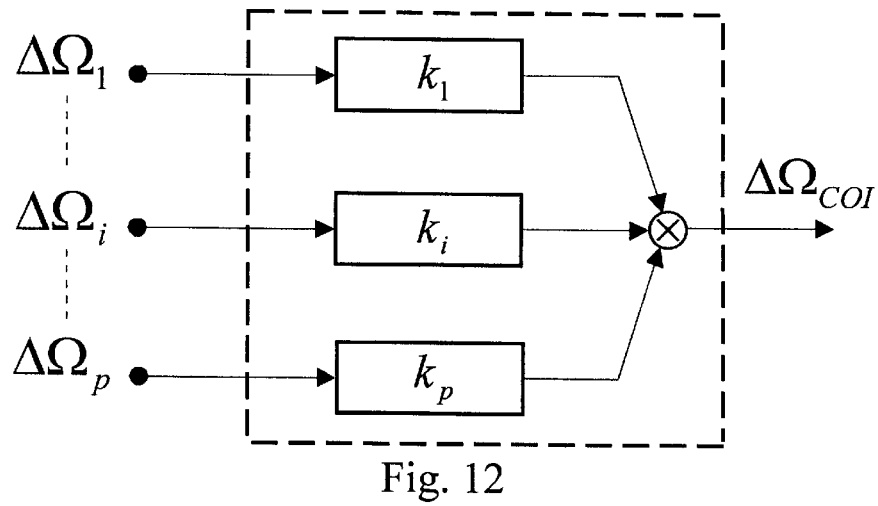
FIG. 12 is a formation of a $\Delta\Omega_{CO_i}I$.

In the PMT, the blocks are either of zero order, as in FIG. 2a, or of first order as in FIG. 2b. The "in" and "out" of each block are assigned with node numbers. An example of connection of a four-block system is shown in FIG. 12 and referred to in TFDEPC 9.3. Thus, referring to the respective node numbers, the connection L-matrix can be constructed in the following form:

$$\begin{bmatrix} X_i \\ Y \\ M_i \end{bmatrix} = \begin{bmatrix} L_1 & L_2 & L_3 \\ L_4 & L_5 & L_6 \\ L'_7 & L'_8 & L'_9 \end{bmatrix} \begin{bmatrix} X \\ R \\ M \end{bmatrix} \quad \begin{matrix}(17a)\\(17b)\\(17c)\end{matrix}$$

where $X_i$, X, $M_i$ and M are vectors collecting all the $x_i$, x, $m_i$ and m variables of FIG. 2, and R and Y are the input and output vectors. As the equation of the nth zero order block is $m_n = k_n m_i$, the matrix equation for all zero order blocks will be $$M = KM_i \quad (18)$$

where $$K = \langle k_n \rangle \quad (19)$$

=diagonal matrix of $k_n$, n=1,2, . . . .

Similarly, the equation of the first order block is $$x_n = x_{i_n}(b_n + pT_{b_n})/(a_n + pT_{a_n}) \quad (20)$$

Expanding (20), the equation for all the first order blocks is $$\dot{X} = -K_a X + K_b X_i + K_f \dot{X}_i \quad (21)$$

where $$K_a = \langle k_{a_n} \rangle = \langle a_n / T_{a_n} \rangle \quad (22a)$$

$$K_b = \langle k_{b_n} \rangle = \langle b_n / T_{a_n} \rangle \quad (22b)$$

and $$K_f = \langle k_{f_n} \rangle = \langle T_{b_n} / T_{a_n} \rangle \quad (22c)$$

are diagonal matrices (n=1,2 . . . ).

The state space equation can be constructed from (17), (18) and (21) by eliminating $M_i$, M and then $X_i$ from (17).

Therefore, substituting (17c) in (18), $$M = KM_i = KL'_7 X + KL'_8 R + KL'_9 M = L_7 X + L_8 R + L_9 M$$

so $$M = H(L_7 X + L_8 R) \quad (23)$$

where $$H = (I - L_9)^{-1}$$

and

I=identity matrix

Substituting (23) in (17b), $$Y = L_4 X + L_5 R + L_6 H(L_7 X + L_8 R)$$

so $$Y = CX + DR \quad (14)$$

where $$C = L_4 + L_6 H L_7$$

and $$D = L_5 + L_6 H L_8$$

Substituting (23) in (17a), $$X_i = L_1 X + L_2 R + L_3 H(L_7 X + L_8 R)$$

so $$X_i = FX + GR \quad (24)$$

where $$F = L_1 + L_3 H L_7 \quad (25)$$

and $$G = L_2 + L_3 H L_8$$

Substituting (24) in (21), $$\dot{X} = -K_a X + K_b(FX + GR) + K_f(F\dot{X} + G\dot{R})$$

so that $$\dot{X} = AX + BR + E\dot{R} \quad (13)$$

where $$A = S(K_b F - K_a) \quad (26)$$

$$B = SK_b G$$

$$E = SK_f G$$

and $$S = (I - K_f F)^{-1} \quad (27)$$

9.3 Formation of the L-Matrix

With reference to the simple example of a four-block system shown in FIG. 12, and by comparing the corresponding node numbers of the LHS and RHS vectors ("1" if equal otherwise "0"), the sparse connection-matrix equation is $$\begin{matrix}(12)\\(13)\\(13)\\(11)\\(14)\end{matrix}\begin{bmatrix} x_{i_1} \\ x_{i_2} \\ y \\ m_{i_1} \\ m_{i_2} \end{bmatrix} = \begin{bmatrix} & (13) & (14) & (11) & (12) & (11) \\ & & & & 1 \\ & 1 & & & \\ & 1 & & & \\ & & & 1 & 1 \\ & & 1 & & \end{bmatrix}\begin{bmatrix} x_1 \\ x_2 \\ r \\ m_1 \\ m_2 \end{bmatrix}\begin{matrix}(13)\\(14)\\(11)\\(12)\\(11)\end{matrix}$$

Since the input data are a sequence of blocks (i.e. branch) rather than nodal information, this technique is much simpler and faster than the indirect method of using incidence matrices in this case.

9.4 Representation of Complicated Transfer Functions

Figure 13:
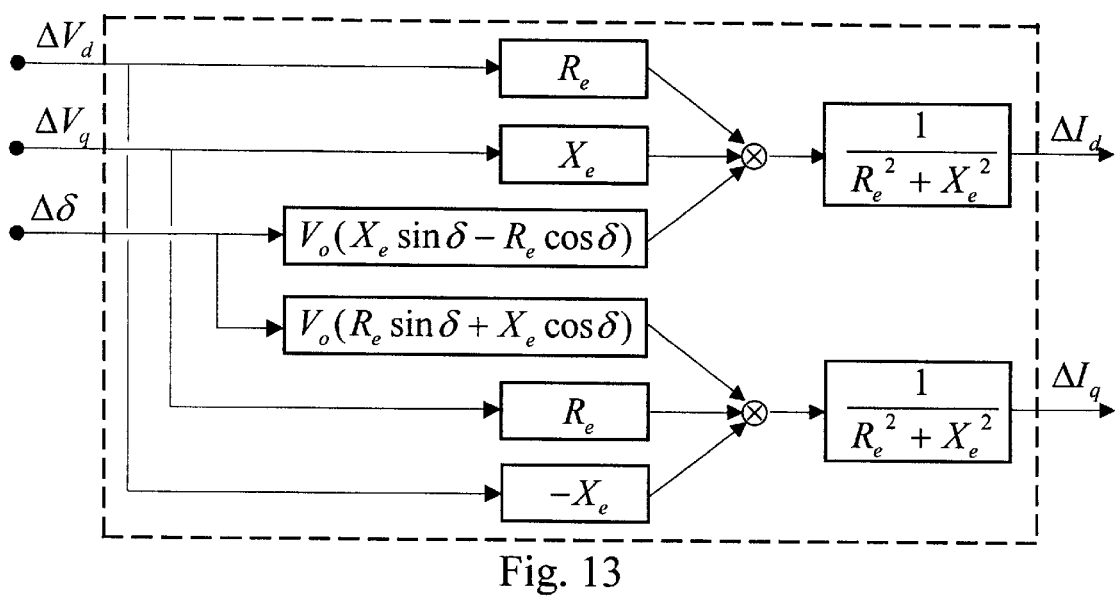
FIG. 13 is a tieline infinite busbar network module.

Nonlinear function under small perturbations, or "quadratic" transfer functions, may be expressed as elementary blocks in FIG. 2, as illustrated for some typical cases shown in FIG. 13.

Case a:  $Z = XY$
$$\Delta Z = Y\Delta X + X\Delta Y$$

Case b:  $E = |V + jIX|$
$$E^2 = V^2 + I^2X^2$$
$$\Delta E = (V/E)\Delta V + (X^2I/E)\Delta I$$

Similarly  $I = |I_d + jI_q|$
$$\Delta I = (I_d/I)\Delta I_d + (I_q/I)\Delta I_q$$

Case c:  $E = f(I)$
$$\Delta E = m\Delta I$$

where  $m$ = slope $(\partial E/\partial I)$ at the operating point.

Case d: A 'quadratic' transfer function may be represented by two elementary blocks. The two block diagrams are identical so long as $$G = C_1$$
$$A = D_0 C_1 / C_0$$
$$K = C_0/C_1^2 + D_0/C_0 - D_1/C_1$$
$$B = C_0/C_1$$

In the limiting case where $C_o=0$, $C_1=0$, or if the numerator polynomial is also quadratic, it is still possible to express the original second order block as a combination of elementary blocks by more elaborate circuit block manipulation. Being a combination of quadratic and first order, the high order polynomial can be also represented by elementary blocks.

9.5 COI Reference Frame

The position of the COI is defined as $$\delta_{COI} = \sum_{i=1}^{p} k_i \delta_i \quad (28)$$

where $k_i = H_i/H_T$ and $H_i$, $H_T$ are the individual and the sum of the inertia constant of the generator. $\delta_i$ is the position of generator i with respect to the stationary frame.

i.e. $\quad \Omega_{COI} = \sum_{i=1}^{p} k_i \Omega_i \quad (29)$

Applying the small perturbation to (29), (30) and the COI speed signal are obtained (FIG. 14).

$$\Delta\Omega_{COI} = \sum_{i=1}^{p} k_i \Delta\Omega_i \quad (30)$$

9.6 Evaluation of Sensitivity Coefficients $\partial\lambda/\partial\kappa$

9.6.1. Sensitivity for Arbitrary Block Parameters

From (26) and (27), system matrix A is a function of $K_b$, $K_a$ and $K_t$. Hence, for $\kappa = k_b$, $k_a$ or $k_t$ in the nth block as defined in (22), $\partial A/\partial \kappa$ can be expressed as follows:

$$\frac{\partial A}{\partial k_b} = S\frac{\partial K_b}{\partial k_b}F \quad (31a)$$

$$\frac{\partial A}{\partial k_a} = -S\frac{\partial K_a}{\partial k_a} \quad (31b)$$

or $$\frac{\partial A}{\partial k_t} = \frac{\partial S}{\partial k_t}(K_b F - K_a) \quad (31c)$$
$$= -S\frac{\partial(I - K_t F)}{\partial k_t}S(K_b F - K_a)$$
$$= S\frac{\partial K_t}{\partial k_t}FS(K_b F - K_a) = S\frac{\partial K_t}{\partial k_t}FA$$

where $\partial K/\partial k$ ($\partial K_b/\partial k_b$, $\partial K_a/\partial k_a$ and $\partial K_c/\partial k_c$) will have only one non-zero element of unity value (the nth diagonal element). Therefore, if $W^T = (w_1, w, \ldots)$ and $Z^T = (z_1, z_2, \ldots)$ are two arbitrary vectors, the product of $W^T (\partial K/\partial k)Z = w_n z_n$ will be as simple as the product of two scalars. Because of this feature, $\partial\lambda/\partial\kappa$ can be evaluated very easily as shown below.

Define the scalar $$h = V^T U = (v_1, v_2, \ldots)(u_1, u_2, \ldots)^T$$

and the vectors $$W = V^T S = (w_1, w_2, \ldots) \quad (32a)$$

$$Z = FU = (z_1, z_2, \ldots)^T \quad (32b)$$

where S and F are already available in (27) and (25), respectively, when forming the state space equation. Substituting (31) in (15), $$\frac{\partial\lambda}{\partial k_b} = \frac{V^T S\frac{\partial K_b}{\partial k_b}FU}{V^T U} = \frac{W^T \frac{\partial K_b}{\partial k_b}Z}{V^T U} = \frac{w_n z_n}{h} \quad (33a)$$

$$\frac{\partial\lambda}{\partial k_a} = \frac{-V^T S\frac{\partial K_a}{\partial k_a}U}{V^T U} = -\frac{w_n u_n}{h} \quad (33b)$$

or $$\frac{\partial\lambda}{\partial k_t} = \frac{V^T S\frac{\partial K_t}{\partial k_t}FAU}{V^T U} = \frac{V^T S\frac{\partial K_t}{\partial k_t}FU\lambda}{V^T U} = \frac{w_n z_n \lambda}{h} \quad (33c)$$

Hence for $\kappa = b, a, T_b,$ or $T_a$, $\partial\lambda/\partial\kappa$ becomes, using (22), $$\frac{\partial\lambda}{\partial b} = \frac{\partial\lambda}{\partial k_b}\frac{\partial k_b}{\partial b} = \frac{\partial\lambda}{\partial k_b}\frac{1}{T_a} = \frac{w_n z_n}{hT_a} \quad (34a)$$

$$\frac{\partial\lambda}{\partial a} = \frac{-w_n u_n}{hT_a} \quad (34b)$$

$$\frac{\partial\lambda}{\partial T_b} = \frac{w_n z_n \lambda}{hT_a} \quad (34c)$$

or $$\frac{\partial\lambda}{\partial T_a} = \frac{\partial\lambda}{\partial k_b}\frac{\partial k_b}{\partial T_a} + \frac{\partial\lambda}{\partial k_a}\frac{\partial k_a}{\partial T_a} + \frac{\partial\lambda}{\partial k_t}\frac{\partial k_t}{\partial T_a} \quad (34d)$$
$$= -\left(\frac{\partial\lambda}{\partial k_b}b + \frac{\partial\lambda}{\partial k_a}a + \frac{\partial\lambda}{\partial k_t}T_b\right)/T_a^2$$
$$= -w_n(z_n b - u_n a + \lambda z_n T_b)/(hT_a^2)$$

Consequently, the sensitivities of $\lambda$, with respect to the nth block, are obtained by picking up nth elements from the vectors U, W arid Z and then performing a simple algebraic operation with some other scalars according to (34), where W and Z can be derived from V and U in (32). Therefore the sensitivity with respect to all block parameters can be evaluated once theses vectors are formed.

9.6.2 Sensitivities for Arbitrary System Parameters

With diagonal matrix K of (19) collecting all the parameters of zero order blocks, parameters associated with system operating condition are all included in K. From (25), (26), and (27), $\partial A/\partial \kappa$ can be expressed as $$\frac{\partial A}{\partial \kappa} = \frac{\partial [S(K_b F - K_a)]}{\partial \kappa} = S\left(K_t \frac{\partial F}{\partial \kappa} A + K_b \frac{\partial F}{\partial \kappa}\right) \quad (35a)$$

$$\frac{\partial F}{\partial \kappa} = \frac{\partial (L_1 + L_3 H L_7)}{\partial \kappa} = L_3 H \frac{\partial K}{\partial \kappa}(L_9' H + I)L_7' \quad (35b)$$

Investigating the elements of K associated with system operating condition, some of them are the simple functions of variables associated with generator buses, which are collected in $M_1$ of (16) or $M_{1(i)}$ of (36) corresponding to i-th machine.

$$M_{1(i)} = [I_{di}, I_{qi}, V_{di}, V_{qi}, V_{ti}, \cos\delta_i, \sin\delta_i] \quad (36)$$

The others describing network equation are collected in $M_2$ of (16). With $\partial K/\partial \kappa$ constructed from the partial derivatives of elements of $M_1$ and $M_2$, $\partial \lambda/\partial \kappa$ for $\kappa$=(system parameter) therefore can be evaluated from (15) and (35).

9.6.2.1 Derivatives of $M_{1(i)}$ to j-th Nodal Voltages ($V_{Rj}$+ $jV_{Jj}$)

Firstly, assuming that the nodal voltages and generator currents are defined in rectangular coordinates. $E_{Qi}$ can also be expressed referencing network frame as:

$$E_{QRi} + jE_{QJi} = (V_{Ri} + jV_{Ji}) + (I_{Ri} + jI_{Ji})(R_{ai} + jX_{qi}), \quad (37)$$
$$E_{QRi} = V_{Ri} + I_{Ri}R_{ai} - I_{Ji}X_{qi},$$
$$E_{QJi} = V_{Ji} + I_{Ri}X_{qi} + I_{Ji}R_{ai}$$

$$E_{Qi}^2 = E_{QRi}^2 + E_{QJi}^2, \quad (38)$$
$$E_{QRi} = -E_{Qi}\sin\delta_i,$$
$$E_{QJi} = E_{Qi}\cos\delta_i$$

From the nodal voltage equation of overall network I=YV, coordinates transformation (11) and, $$V_{ti}^2 = V_{Ri}^2 + V_{Ji}^2 \quad (39)$$

the partial derivatives can be expressed as follows by using a constant $C_o$ with $C_o$=1 for i=j and $C_o$=o for i≠j. Subscript "(.)j" stands for "Rj" or "Jj".

$$\frac{\partial I_{Ri}}{\partial V_{Rj}} = \frac{\partial I_{Ji}}{\partial V_{Jj}} = G_{ij} \quad (40a)$$

$$\frac{\partial I_{Ri}}{\partial V_{Jj}} = -\frac{\partial I_{Ji}}{\partial V_{Rj}} = -B_{ij} \quad (40b)$$

$$\frac{\partial E_{QRi}}{\partial V_{Rj}} = \frac{\partial E_{QJi}}{\partial V_{Jj}} = C_0 + R_{ai}\frac{\partial I_{Ri}}{\partial V_{Rj}} - X_{qi}\frac{\partial I_{Ji}}{\partial V_{Rj}} \quad (41a)$$

$$\frac{\partial E_{QRi}}{\partial V_{Jj}} = -\frac{\partial E_{QJi}}{\partial V_{Rj}} = R_{ai}\frac{\partial I_{Ri}}{\partial V_{Jj}} - X_{qi}\frac{\partial I_{Ji}}{\partial V_{Jj}} \quad (41b)$$

-continued $$\frac{\partial E_{Qi}}{\partial V_{(.)j}} = -\frac{\partial E_{QRi}}{\partial V_{(.)j}}\sin\delta_i + \frac{\partial E_{QJi}}{\partial V_{(.)j}}\cos\delta_i \quad (41c)$$

$$\frac{\partial \sin\delta_i}{\partial V_{(.)j}} = \frac{-1}{E_{Qi}}\left(\frac{\partial E_{QRi}}{\partial V_{(.)j}} + \frac{\partial E_{Qi}}{\partial V_{(.)j}}\sin\delta_i\right),$$

$$\frac{\partial \cos\delta_i}{\partial V_{(.)j}} = \frac{1}{E_{Qi}}\left(\frac{\partial E_{QJi}}{\partial V_{(.)j}} - \frac{\partial E_{Qi}}{\partial V_{(.)j}}\cos\delta_i\right) \quad (42)$$

$$\frac{\partial I_{di}}{\partial V_{(.)j}} = \frac{\partial I_{Ri}}{\partial V_{(.)j}}\cos\delta_i + \frac{\partial I_{Ji}}{\partial V_{(.)j}}\sin\delta_i +$$
$$I_{Ri}\partial\cos\frac{\delta_i}{\partial V_{(.)j}} + I_{Ji}\partial\sin\frac{\delta_i}{\partial V_{(.)j}},$$

$$\frac{\partial I_{qi}}{\partial V_{(.)j}} = -\frac{\partial I_{Ri}}{\partial V_{(.)j}}\sin\delta_i + \frac{\partial I_{Ji}}{\partial V_{(.)j}}\cos\delta_i - \quad (43)$$
$$I_{Ri}\partial\sin\frac{\delta_i}{\partial V_{(.)j}} + I_{Ji}\partial\cos\frac{\delta_i}{\partial V_{(.)j}}$$

$$\frac{\partial V_{di}}{\partial V_{Rj}} = C_0\cos\delta_i + V_{Ri}\partial\cos\frac{\delta_i}{\partial V_{Rj}} + V_{Ji}\partial\sin\frac{\delta_i}{\partial V_{Rj}},$$

$$\frac{\partial V_{di}}{\partial V_{Jj}} = C_0\sin\delta_i + V_{Ri}\partial\cos\frac{\delta_i}{\partial V_{Jj}} + V_{Ji}\partial\sin\frac{\delta_i}{\partial V_{Jj}},$$

$$\frac{\partial V_{qi}}{\partial V_{Rj}} = -C_0\sin\delta_i - V_{Ri}\partial\sin\frac{\delta_i}{\partial V_{Rj}} + V_{Ji}\partial\cos\frac{\delta_i}{\partial V_{Rj}},$$

$$\frac{\partial V_{qi}}{\partial V_{Jj}} = C_0\cos\delta_i - V_{Ri}\partial\sin\frac{\delta_i}{\partial V_{Jj}} + V_{Ji}\partial\cos\frac{\delta_i}{\partial V_{Jj}} \quad (44)$$

$$\frac{\partial V_{ti}}{\partial V_{Rj}} = C_0\frac{V_{Ri}}{V_{ti}}, \frac{\partial V_{ti}}{\partial V_{Jj}} = C_0\frac{V_{Ji}}{V_{ti}} \quad (45)$$

9.6.2.2 Derivatives of $M_2$ to Nodal Voltages ($V_{Rj}$+$jV_{Jj}$)

$M_2$ of (16) will be consisted of the elements of $Y_{GG}'$ alone when the machine is considered only. When static loads are represented by equivalent shunt admittances and added to the corresponding diagonal elements of $Y_{LL}'$ of (4), only the equivalent admittances are affected by nodal voltages. Thus, $$\frac{\partial Y_{GG}'}{\partial V_{(.)j}} = \frac{\partial}{\partial V_{(.)j}}[Y_{GG} - Y_{GL}(Y_{LL}')^{-1}Y_{LG}] \quad (46)$$

$$= Y_{GL}Y_{LL}^{-1}\frac{\partial Y_{LL}'}{\partial V_{(.)j}}Y_{LL}^{-1}Y_{LG}$$

When the deviation of nodal voltages is regarded being independent with load powers, differentiation of (47a) yields (47b).

$$\Delta G_{ii} + j\Delta B_{ii} = (P_{L,i} - jQ_{L,i})/V_{ti}^2 \quad (47a)$$

$$\frac{\partial (\Delta G_{ii} + j\Delta B_{ii})}{\partial V_{(.)i}} = \frac{-2V_{(.)i}}{V_{ti}^4}(P_{L,i} - jQ_{L,i}) \quad (47b)$$

If the deviation of nodal voltages is risen from the variation of nodal powers, the equivalent admittances should be expressed by nodal injected currents as:

$$\Delta G_{ii} + j\Delta B_{ii} = -\frac{I_{Ri} + jI_{Ji}}{V_{Ri} + jV_{Ji}} \quad (48)$$

and the injected currents are determined by nodal voltage equation I=YV. Therefore, $$\frac{\partial \Delta G_{ii}}{\partial V_{(.)j}} = \frac{-1}{V_{ti}^2}\left[C_0(2V_{(.)j}\Delta G_{ii} \div I_{(.)j}) + V_{Ri}\frac{\partial I_{Ri}}{\partial V_{(.)j}} \div V_{Ji}\frac{\partial I_{Ji}}{\partial V_{(.)j}}\right], \quad (49)$$

$$\frac{\partial \Delta B_{ii}}{\partial V_{Rj}} = \frac{-1}{V_{ti}^2}\left[C_0(2V_{Ri}\Delta B_{ii} \div I_{Ji}) \div V_{Ri}\frac{\partial I_{Ji}}{\partial V_{Rj}} - V_{Ji}\frac{\partial I_{Ri}}{\partial V_{Rj}}\right],$$

$$\frac{\partial \Delta B_{ii}}{\partial V_{Jj}} = \frac{-1}{V_{ti}^2}\left[C_0(2V_{Ji}\Delta B_{ii} - I_{Ri}) + V_{Ri}\frac{\partial I_{Ji}}{\partial V_{Jj}} - V_{Ji}\frac{\partial I_{Ri}}{\partial V_{Jj}}\right]$$

9.6.2.3 Derivatives to Nodal Voltages ($V_j$, $\delta_{vj}$)

When nodal voltages in polar coordinates are defined as $V_j \angle \delta_{vj}$, the derivatives of any element $M_i$ in and $M_1$ or $M_2$ of (16) can be obtained from $V_{Rj}=V_j \cos\delta_{vj}$ and $V_{Jj}=V_j \cos\delta_{vJ}$ as:

$$\frac{\partial M_i}{\partial V_j} = \frac{\partial M_i}{\partial V_{Rj}}\cos\delta_{vj} + \frac{\partial M_i}{\partial V_{Jj}}\sin\delta_{vj}, \quad (50)$$

$$\frac{\partial M_i}{\partial \delta_{vj}} = -\frac{\partial M_i}{\partial V_{Rj}}V_j\sin\delta_{vj} + \frac{\partial M_i}{\partial V_{Jj}}V_j\cos\delta_{vj}.$$

9.6.2.4 Derivatives of K to Nodal Injected Power ($P_j+Q_j$)

Jacobian matrix J used in load flow calculation determines the linearized relationship between nodal powers and nodal voltages. $\partial V_{Rj}/\partial P_j$, $\partial V_{Rj}/\partial Q_j$, $\partial V_{Jj}/\partial P_j$ and $\partial V_{Jj}/\partial Q_j$ are the elements of $J^{-1}$. Therefore, the derivatives of any element $M_i$ in and $M_1$ or $M_2$ of (16) to nodal powers will be expressed as:

$$\frac{\partial M_i}{\partial P_j} = \sum_i \left(\frac{\partial M_i}{\partial V_{Ri}}\frac{\partial V_{Ri}}{\partial P_j} + \frac{\partial M_i}{\partial V_{Ji}}\frac{\partial V_{Jj}}{\partial P_j}\right) \quad (51)$$

$$\frac{\partial M_i}{\partial Q_j} = \sum_i \left(\frac{\partial M_i}{\partial V_{Ri}}\frac{\partial V_{Ri}}{\partial Q_j} + \frac{\partial M_i}{\partial V_{Ji}}\frac{\partial V_{Jj}}{\partial Q_j}\right)$$

9.6.2.5 Derivatives of K to Line Admittance ($y_{mn}=g_{mn}+jb_{mn}$)

Change of a line admittance $y_{mn}$ will affect admittance matrix Y and the initial system operating condition described by nodal voltages and injected currents. Derivative of K with respect to $b_{mn}$ has the same form as that to $g_{mn}$. Only the latter is discussed.

The derivatives of $Y_{GG}'$ to $g_{mn}$ will be obtained from $\partial Y/\partial g_{mn}$ which is constructed as: "1" on the sits of (m,m) and (n,n), "−1" on the sits of (m,n) and (n,m), "0" on other sites The derivative of $Y_{GG}'$ with respect to $g_{mn}$ is:

$$\frac{\partial Y_{GG}'}{\partial g_{mn}} = \frac{\partial Y_{GG}}{\partial g_{mn}} - \frac{\partial Y_{GL}}{\partial g_{mn}}(Y_{LL}')^{-1}Y_{LG} + \quad (52)$$

$$Y_{GL}(Y_{LL}')^{-1}\frac{\partial Y_{LL}'}{\partial g_{mn}}(Y_{LL}')^{-1}Y_{LG} - Y_{GL}(Y_{LL}')^{-1}\frac{\partial Y_{LG}}{\partial g_{mn}}$$

However, due to I=YV, (40) will become (in vector form)

$$\frac{\partial I}{\partial g_{min}} = Y\frac{\partial V}{\partial g_{mn}} + \frac{\partial Y}{\partial g_{mn}}V \quad (53)$$

From (41) to (45), if $\partial M_i/\partial V$ is regarded as a linear function of $\partial I/\partial V$ denoted as f(.), the derivatives of $M_i$ will be represented in vector form as $$\frac{\partial M_i}{\partial g_{mn}} = f\left(\frac{\partial I}{\partial V}\right)\frac{\partial V}{\partial g_{mn}} + f\left(\frac{\partial Y}{\partial g_{mn}}V\right) \quad (54)$$

$\partial V/\partial g_{mn}$ can be solved from (55) which is obtained by differentiating the nodal power equation.

$$\frac{\partial V_i}{\partial g_{mn}}I_i^* + \sum_j \left(V_i\frac{\partial Y_{ij}^*}{\partial g_{mn}}V_j^* + V_iY_{ij}^*\frac{\partial V_j^*}{\partial g_{mn}}\right) = 0, \quad (55)$$

$i = 1, 2, 3, \ldots$

9.7 Single 3rd-Order Machine Infinite Busbar Model

The single 3-rd order machine infinite busbar model can be established by connecting the 3rd-order machine module in FIG. 4 with the tieline infinite busbar network module (FIG. 13) [25]. The reference frame is stationary, that is Δ, $\Omega_{ref}=0$.

We claim:

1. A model for testing an entire power transmission system under small perturbation stability comprising:

a microprocessor for conducting stability analyses of said power system;

a plurality of first type of plug-in transfer blocks representing various components of said power system and processable by said microprocessor wherein each block is derived from sets of equations representing one of said components;

a recombination network represented by a second type of transfer blocks, wherein said second type of block is derived from sets of network equations representing the power system network and said second type of block is adapted to receive a first set of said first type of plug-in blocks to form a model of a power system, such that an entire power system may be tested for small perturbation stability by simple matrix manipulation when processed by said microprocessor.

2. A method for modeling a power transmission system under small perturbation stability comprising the steps of:

a. providing a microprocessor for conducting stability analyses of said power system;

b. preparing a plurality of first type of plug-in transfer blocks representing various components of said power system and processable by said microprocessor wherein each block is derived from sets of equations representing one of said components;

c. providing a recombination network represented by a second type of transfer blocks, wherein said second type of block is derived from sets of network equations representing the power system network and said second type of block is adapted to receive a first set of said first type of plug-in blocks to form a model of a power system, such that an entire power system may be tested for small perturbation stability by simple matrix manipulation d. matrix manipulating of said recombination network to test for small perturbation stability of an entire power system.

* * * * *